(12) United States Patent
Loveland et al.

(10) Patent No.: US 10,012,735 B1
(45) Date of Patent: Jul. 3, 2018

(54) GPS OFFSET CALIBRATIONS FOR UAVS

(71) Applicant: Loveland Innovations, LLC, Alpine, UT (US)

(72) Inventors: Jim Loveland, Alpine, UT (US); Leif Larson, Alpine, UT (US); Dan Christiansen, Alpine, UT (US); Tad Christiansen, Alpine, UT (US); Cam Christiansen, Alpine, UT (US)

(73) Assignee: Loveland Innovations, LLC, Alpine, UT (US)

( * ) Notice: Subject to any disclaimer, the term of this patent is extended or adjusted under 35 U.S.C. 154(b) by 0 days.

(21) Appl. No.: 15/820,244

(22) Filed: Nov. 21, 2017

Related U.S. Application Data

(60) Provisional application No. 62/501,326, filed on May 4, 2017.

(51) Int. Cl.
| | | |
|---|---|---|
| *G01S 19/07* | (2010.01) | |
| *G05D 1/00* | (2006.01) | |
| *B64C 39/02* | (2006.01) | |
| *G05D 1/10* | (2006.01) | |

(52) U.S. Cl.
CPC ............ *G01S 19/07* (2013.01); *G05D 1/0038* (2013.01); *G05D 1/0044* (2013.01); *G05D 1/101* (2013.01); *B64C 39/024* (2013.01); *B64C 2201/123* (2013.01); *B64C 2201/145* (2013.01); *B64C 2201/146* (2013.01)

(58) Field of Classification Search
CPC ...... G01S 19/07; G05D 1/101; G05D 1/0038; G05D 1/0044; B64C 2201/145; B64C 39/024; B64C 2201/146; B64C 2201/123

USPC .............................................. 701/2
See application file for complete search history.

(56) References Cited

U.S. PATENT DOCUMENTS

| | | | | |
|---|---|---|---|---|
| 5,467,271 | A | * | 11/1995 | Abel ...................... A01B 9/005 702/5 |
| 5,721,691 | A | | 2/1998 | Wuller |
| 5,912,642 | A | * | 6/1999 | Coffin ................. H01Q 1/1257 342/359 |
| 6,037,945 | A | | 3/2000 | Loveland |
| 6,810,383 | B1 | | 10/2004 | Loveland |
| 6,816,819 | B1 | | 11/2004 | Loveland |
| 6,826,539 | B2 | | 11/2004 | Loveland |

(Continued)

OTHER PUBLICATIONS

USPTO Non-final Office Action; U.S. Appl. No. 15/388,754; dated May 26, 2017.

(Continued)

*Primary Examiner* — Tyler J Lee
(74) *Attorney, Agent, or Firm* — Phillips, Ryther & Winchester; Justin Flanagan

(57) ABSTRACT

An unmanned aerial vehicle (UAV) assessment and reporting system may conduct micro scans of a wide variety of property types. A site identification system may allow for identification of a point or points of interest to be scanned via the micro scans. A coordinate offset system may calculate a coordinate offset of location coordinates from a satellite-based mapping system relative to real-time coordinate readings from an on-site UAV. Satellite-based location coordinates for the identified point(s) of interest may be adjusted based on the calculated coordinate offset to enhance the scanning itself, data association, visualization of scan data, and/or reporting of scan data.

16 Claims, 32 Drawing Sheets

(56) References Cited

U.S. PATENT DOCUMENTS

| | | | |
|---|---|---|---|
| 6,829,584 B2 | 12/2004 | Loveland | |
| 7,363,157 B1 | 4/2008 | Hanna | |
| 7,447,564 B2 | 11/2008 | Yasukawa | |
| 7,868,812 B2 | 1/2011 | Huthoefer | |
| 8,078,436 B2 | 12/2011 | Pershing | |
| 8,159,662 B2 | 4/2012 | Rezac | |
| 8,170,840 B2 | 5/2012 | Pershing | |
| 8,209,152 B2 | 6/2012 | Pershing | |
| 8,345,578 B2 | 1/2013 | Thoumy | |
| 8,473,125 B2 | 6/2013 | Rischmuller | |
| 8,542,880 B2 | 9/2013 | Thornberry | |
| 8,718,838 B2 | 5/2014 | Kokkeby | |
| 8,757,548 B2 * | 6/2014 | Stecko | B64D 39/00 244/135 A |
| 8,818,572 B1 | 8/2014 | Tofte | |
| 8,818,770 B2 | 8/2014 | Pershing | |
| 8,823,732 B2 | 9/2014 | Adams | |
| 8,825,454 B2 | 9/2014 | Pershing | |
| 9,036,861 B2 | 5/2015 | Chen | |
| 9,075,415 B2 | 7/2015 | Kugelmass | |
| 9,098,655 B2 | 8/2015 | Plummer | |
| 9,129,376 B2 | 9/2015 | Pershing | |
| 9,135,737 B2 | 9/2015 | Pershing | |
| 9,152,863 B1 | 10/2015 | Grant | |
| 9,162,753 B1 | 10/2015 | Panto | |
| 9,201,422 B2 | 12/2015 | Ohtomo | |
| 9,489,575 B1 * | 11/2016 | Whalen | G01S 13/94 |
| 9,501,061 B2 | 11/2016 | Canoy | |
| 9,501,700 B2 | 11/2016 | Loveland | |
| 9,505,494 B1 | 11/2016 | Marlow | |
| 9,513,635 B1 | 12/2016 | Bethke | |
| 9,563,201 B1 | 2/2017 | Tofte | |
| 9,609,288 B1 | 3/2017 | Richman | |
| 9,613,538 B1 | 4/2017 | Poole | |
| 9,618,940 B1 | 4/2017 | Michini | |
| 9,639,960 B1 | 5/2017 | Loveland | |
| 9,734,397 B1 | 8/2017 | Larson | |
| 9,805,261 B1 | 10/2017 | Loveland | |
| 9,823,658 B1 | 11/2017 | Loveland | |
| 2004/0066917 A1 | 4/2004 | Yasukawa | |
| 2009/0201190 A1 | 8/2009 | Huthoefer | |
| 2009/0265193 A1 | 10/2009 | Collins | |
| 2010/0215212 A1 | 8/2010 | Flakes | |
| 2010/0277723 A1 | 11/2010 | Rezac | |
| 2012/0237083 A1 | 9/2012 | Lange | |
| 2013/0216089 A1 | 8/2013 | Chen | |
| 2014/0168420 A1 | 6/2014 | Naderhirn | |
| 2014/0316614 A1 | 10/2014 | Newman | |
| 2014/0316616 A1 | 10/2014 | Kugelmass | |
| 2014/0324405 A1 | 10/2014 | Plummer | |
| 2014/0336928 A1 | 11/2014 | Scott | |
| 2015/0019267 A1 | 1/2015 | Prieto | |
| 2015/0148955 A1 | 5/2015 | Chin | |
| 2015/0220085 A1 | 8/2015 | Ohtomo | |
| 2015/0225081 A1 | 8/2015 | Kespry | |
| 2015/0348204 A1 | 12/2015 | Daues | |
| 2015/0371346 A1 | 12/2015 | Frendling | |
| 2015/0377405 A1 | 12/2015 | Down | |
| 2016/0004795 A1 | 1/2016 | Novak | |
| 2016/0148363 A1 | 5/2016 | Phan | |
| 2016/0246304 A1 | 8/2016 | Canoy | |
| 2016/0247115 A1 | 8/2016 | Pons | |
| 2016/0253808 A1 | 9/2016 | Metzler | |
| 2016/0257424 A1 | 9/2016 | Kespry | |
| 2016/0292872 A1 | 10/2016 | Hammond | |
| 2016/0301859 A1 | 10/2016 | Tebay | |
| 2016/0307447 A1 | 10/2016 | Johnson | |
| 2016/0321503 A1 | 11/2016 | Zhou | |
| 2016/0327959 A1 | 11/2016 | Brown | |
| 2016/0347462 A1 | 12/2016 | Kespry | |
| 2016/0363929 A1 | 12/2016 | Kespry | |
| 2016/0365825 A1 | 12/2016 | Poivet | |
| 2016/0377424 A1 | 12/2016 | Clark | |
| 2017/0053169 A1 | 2/2017 | Cuban | |
| 2017/0090481 A1 | 3/2017 | Kespry | |
| 2017/0123035 A1 | 5/2017 | Kespry | |
| 2017/0146344 A1 | 5/2017 | Kespry | |
| 2017/0193829 A1 | 7/2017 | Bauer | |
| 2017/0249510 A1 | 8/2017 | Labrie | |
| 2017/0259920 A1 * | 9/2017 | Lai | B64D 1/18 |
| 2017/0270612 A1 | 9/2017 | Howe | |
| 2017/0270650 A1 | 9/2017 | Howe | |

OTHER PUBLICATIONS

USPTO Non-final Office Action; U.S. Appl. No. 15/360,630; dated Apr. 13, 2017.

USPTO Non-final Office Action; U.S. Appl. No. 15/480,310; dated May 15, 2017.

USPTO Final Office Action; U.S. Appl. No. 15/444,164; dated Jul. 14, 2017.

USPTO Notice of Allowance; U.S. Appl. No. 15/360,630; dated Jun. 21, 2017.

USPTO Notice of Allowance; U.S. Appl. No. 15/360,641; dated Mar. 17, 2017.

USPTO Notice of Allowance; U.S. Appl. No. 15/388,754; dated Oct. 5, 2017.

Autonomous MAV—Cues, Cooper Bills et al., IEEE, 978-1-61284-385-8, 2011, pp. 5776-5783.

Unmanned—Monitoring, C. Eschmann et al., ResearchGate, 2012, pp. 1-8.

USPTO Final Office Action; U.S. Appl. No. 15/446,202; dated Nov. 8, 2017.

USPTO Non-final Office Action; U.S. Appl. No. 15/444,164; dated Apr. 21, 2017.

USPTO Non-final Office Action; U.S. Appl. No. 15/446,202; dated Jun. 28, 2017.

U.S. Appl. No. 15/796,672, Non-Final Office Action dated Dec. 14, 2017.

U.S. Appl. No. 15/708,471, Non-Final Office Action dated Jan. 5, 2018.

* cited by examiner

US 10,012,735 B1

GPS OFFSET CALIBRATIONS FOR UAVS

RELATED APPLICATIONS

This application claims priority to Provisional Application No. 62/501,326 filed on May 4, 2017 titled "GPS Offset Calibration for UAVs," which is hereby incorporated by reference in its entirety.

TECHNICAL FIELD

This disclosure generally relates to systems and methods for autonomous property evaluations and examinations. Specifically, this disclosure relates to positioning system offset calculations, adjustments, and calibration.

BRIEF DESCRIPTION OF THE DRAWINGS

Non-limiting and non-exhaustive embodiments of the disclosure are described herein, including various embodiments of the disclosure with reference to the figures listed below.

information that may be associated with tags, according to one embodiment.

Figure 14:
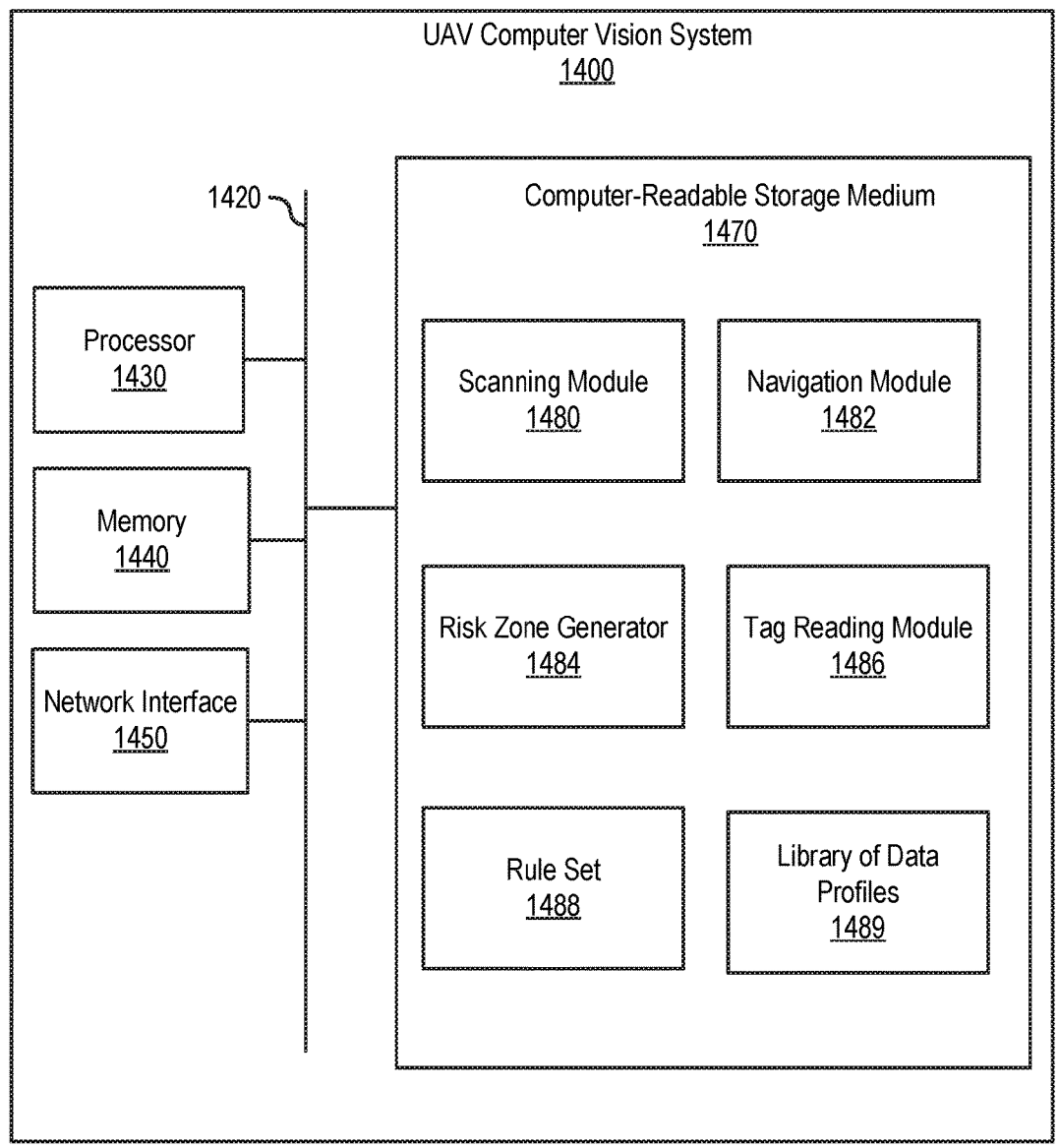

FIG. 14 illustrates a system for property analysis including a property analysis library for computer vision matching, according to one embodiment.

DETAILED DESCRIPTION

This disclosure provides methods and systems for assessing structures and/or other personal property using an unmanned aerial vehicle (UAV). In some embodiments, similar analysis, systems, and methods may be employed, incorporated within, or implemented using autonomous terrestrial vehicles. Thus, while most of the examples and embodiments described herein use UAV's to illustrate the system or method, it is appreciated that some, but not all, of the same systems and methods may be implemented with non-aerial vehicles.

A UAV may carry an imaging system to capture a sequence of images of a target object, such as a structure. The UAV may initially position itself (or be positioned by an operator) above the location of interest to allow the imaging system to capture a nadir image of an area of interest that includes a target structure. The UAV may subsequently follow a boustrophedonic flight path while the imaging system captures a series of closer images and/or collects non-image scan information. The UAV may subsequently position itself around the structure to collect oblique images at one or more heights on each critical side of the structure and/or the vertex of the structure. To collect partial or full structural information, the UAV may perform a loop scan while the imaging system captures a set of oblique images. For additional detailed images of the area of interest, the UAV and imaging system may perform a series of micro scans also known as detailed micro scans. Using the collection of images, a rendering system may generate interactive models of the target structure or other object.

In various embodiments, UAV hardware, firmware, and/or software may be modified, upgraded, and/or programmed to perform the functions, methods, and behaviors described herein. In some embodiments, software, hardware, and/or firmware may be created to interface with pre-existing UAV interfaces. In other embodiments, modifications to one or more portions of a UAV may be made to accomplish the described systems and methods.

Currently, to conduct a site survey a trained technician may be physically present. For example, when an insurance claim is submitted, an insurance agent must travel to the property to assess the damage. Property inspectors also frequently visit structures to manually inspect a property as the result of a homeowner request for an insurance policy quote or a desire to mortgage or refinance a property through a large financial institution. Similarly, solar panel assessment and construction estimates require a trained technician to be on-site. These tasks usually require the trained technician to walk the site, manually photograph the site, and even occasionally climb up on structures for detailed examination. Each technician may perform certain aspects of their jobs differently, resulting in a lack of uniformity. Further, requiring a trained technician to visit sites personally is laborious, dangerous, and/or expensive.

In some embodiments of the present disclosure, a technician may manually operate a UAV to perform one or more assessment tasks. For example, a technician may manually operate a UAV to capture photographs that would have required the technician to scale a building. However, this approach may still require a technician to manually operate the UAV and fails to solve the uniformity problem. Some UAVs have semi-autonomous capabilities. These UAVs may be directed to capture photographs of an operator-identified location. However, semi-autonomous UAVs may not capture a comprehensive image collection of the entire site and may not provide adequate information to replace an on-site technician.

A UAV assessment and reporting system described herein provides a comprehensive, automatic (or at least semi-automatic), and methodical approach for assessing a structure or other object for a particular purpose. For example, the types of assessments, reports, and images collected may vary based on a specific use case. Generally, the approaches obviate the need for an industry-specific trained technician to be present or at least greatly reduce the workload of a technician.

The UAV assessment and reporting system may comprise a site selection interface to receive an electronic input identifying a location of a structure, a boundary identification interface to receive electronic input identifying geographic boundaries of an area that includes the structure, and a UAV to receive the geographic boundaries and the location of the structure from the site selection interface and conduct a structural assessment. The UAV assessment and reporting system may also include a hazard selection interface to receive electronic input identifying geographic hazards such as aboveground power lines, tall trees, neighboring structures, etc. The UAV assessment and reporting system may allow for these hazards to be eliminated from the flight plan to produce a safe path for automated imagery and data capture.

The UAV may include a camera to capture images of the structure, sonar sensors, lidar sensors, infrared sensors, optical sensors, radar sensors, and the like.

The UAV may include an onboard processor and/or a communication interface to communicate with the controller and/or the interface's cloud-based processing. The UAV may include a non-transitory computer-readable medium for receiving and storing instructions that, when executed by the processor, cause the UAV to conduct a structural assessment. The structural assessment may include a boustrophedonic scan of the area defined by geographic boundaries that includes the structure. The boustrophedonic scan may include capturing images during a boustrophedonic flight pattern within a first altitude range. The boustrophedonic scan may also or alternatively include determining distances to a surface for each of a plurality of potential vertical approaches within the area defined by the geographic boundaries.

The UAV assessment and reporting system may include identifying a structure on the site based on the identified geographic boundaries and/or the boustrophedonic scan of the area. The UAV assessment and reporting system may additionally or alternatively include a loop scan of the structure. The loop scan may include a second flight pattern for the UAV to travel around the perimeter of the structure. The second flight pattern may be at a second altitude range lower than the first altitude range. Finally, the UAV assessment and reporting system may additionally or alternatively include a micro scan of the structure in a third flight pattern that includes vertical approaches proximate the structure to capture detailed images of the structure.

In one embodiment, a site may be identified and the UAV may fly to the site and capture a collection of high-resolution images following a comprehensive and methodical autonomous flight pattern. In another embodiment, an operator, even an unskilled operator, may take the UAV to the site and capture a collection of high-resolution images with little to no training. The UAV system may automatically conduct the assessment via an autonomous flight pattern. Based on the assessment or report selected, a UAV assessment and reporting system may determine the appropriate flight pattern, types of images to be captured, number of images to be captured, detail level to be captured, attributes to be identified, measurements to be made, and other assessment elements to be determined.

The UAV assessment and reporting system may use a satellite and/or aerial image to initially identify a site to analyze. In one embodiment, a site selection interface on the operator client may present a satellite image. The site selection interface may receive, from the operator, an electronic input identifying a location of a structure. The operator client may be a controller, computer, phone, tablet, or other electronic device. The operator may mark, via an electronic input on a boundary identification interface, one or more geographic boundaries associated with the structure and/or site. The operator may also identify, on the operator client, obstacles, boundaries, structures, and particular points of interest.

For example, an operator who is attempting to scan a residential lot may be presented with a satellite image on his phone or tablet. The operator may select each corner of the lot to identify the boundaries of the lot. The operator may, for example, drag his finger along the border of a house on the lot to mark the perimeter of the house. Further, if the lot has trees or other obstacles, the operator may, for example, press and hold to identify their location and enter an estimated height. The operator may also circle certain areas on the satellite image to identify particular points of interest. For instance, if the operator is collecting images for an insurance claim on a house that has had its fence blown over by a recent microburst, the operator may circle the fence for a closer inspection and data capture.

In an alternative embodiment, the UAV assessment and reporting system may automatically identify obstacles, boundaries, structures, and particular points of interest using satellite images, county records, topographical maps, and/or customer statements. For example, the UAV assessment and reporting system may receive an address of a commercial property to be assessed for damage caused by a tornado. The UAV assessment and reporting system may use available county records to determine the boundary of the property and topographical maps of the area to identify objects and structures. Further, if a customer submits a claim stating that the entry of a warehouse on the site has collapsed, the UAV assessment and reporting system may receive and parse the submitted claim to identify the entrance as a particular point of interest. Alternatively, a technician or other user may electronically identify the entrance on a map or satellite image.

After the site is identified, the UAV may receive the location of the structure and the identified geographic boundaries. The UAV may first take a nadir image (i.e., top down) of the entire site. The UAV assessment and reporting system may use the nadir image to align the UAV with landmarks established in the initial identification of the site and structure. The UAV assessment and reporting system may also use the nadir image to generate a flight pattern or adjust a predefined flight pattern to ensure accuracy and uniformity.

For example, an initial point, points, or area of interest may be identified using satellite based imagery. For example, satellite based mapping and coordinate systems, such as OpenStreetMap, Google Maps, Google Earth, Apple Maps, Here, Waze, Navmii, MapQuest, Yahoo! Maps, Bing, WikiMapia, Nokia Maps, Rand McNally Maps, USGS Data, and/or the like may be utilized via a user interface to select a structure for scanning. In various embodiments, each location on the satellite image may be associated with global positioning system (GPS) coordinates in decimal degrees (DD), degrees, minutes, seconds (DMS), or degrees and decimal minutes (DDM).

However, it is appreciated that a displayed satellite image from the geographic information system (GIS) may not be perfectly aligned with the actual GPS coordinates. In most instances, the offset of the displayed satellite image and the actual GPS coordinates can be assumed constant for a small displayed region, such as a structure, land parcel, or other property (e.g., a car or industrial equipment).

The presently described systems and methods provide various approaches that may be used in combination or alone. In some embodiments, combinations of mapping coordinate offset calculation approaches may be used in parallel for self-checking, redundancy, and/or to increase accuracy (e.g., via mapping coordinate offset averaging based on multiple approaches).

In one embodiment, a mapping coordinate offset may be calculated between an actual UAV location and mapping system perceived UAV location. The system may use the offset value to adjust and/or correct displayed images and/or user-input coordinates.

In another embodiment, GPS coordinates may be associated with a landmark within the area of interest and/or proximate a point or points of interest. A UAV may navigate to the area and position itself above the landmark. The actual GPS coordinates of the UAV at the location of the landmark may be compared with the GPS coordinates associated with the landmark by the satellite mapping system. A coordinate offset may be calculated for subsequent scanning, navigation, user interface display, and/or image location assignment, as explained in greater detail below.

In another embodiment, a UAV may navigate to the area and capture a nadir image at a location with specific coordinates. The nadir image may be aligned with respect to the satellite base image to calculate a coordinate offset.

In another embodiment, an operator (or autonomous flight system) may be presented with a user interface directing the operator to position the UAV directly over a specific landmark on a satellite based image. A nadir image from the UAV may be overlaid with a target marker indicating the location below the UAV (e.g., straight down or at a known angle). The operator (or autonomous flight system) may navigate the UAV until the target marker is positioned on the indicated landmark. The GPS coordinates of the UAV with the target marker positioned on the indicated landmark may be used to calculate the coordinate offset.

In yet another embodiment, a UAV may be positioned above the area of interest to capture a nadir image or video. An image from a satellite based imaging system may be overlaid on the real-time nadir image. Controls may be used to move the overlaid satellite based image (or alternatively the UAV) until the real-time nadir image and overlaid satellite based image are aligned. Once the two images are aligned, a "confirm alignment" button may be selected and/or the alignment of lines and angles may be automatically determined. The alignment may be used to calculate the coordinate offset for subsequent use.

If the mapping system or other GIS inaccurately displays the satellite image relative to assigned GPS coordinates with too large of an offset between the display and reality, erroneous scans may fail to include the target structure or correct portion of the structure. This could be particularly problematic for partial scans, such as a scan of a chimney. For example, if a chimney is identified using a mapping system that is offset by three meters, the scan may completely omit the chimney. Accordingly, systems and methods described herein may account for and correct for a calculated offset.

The system may need to compare the actual GPS coordinates being reported by the UAV with the GPS coordinates provided by the mapping system based on the user-selected UAV location on the satellite image. The difference represents an offset that can be corrected or adjusted. Each set of coordinates may be associated with a margin for error. For example, the UAV may indicate that the GPS coordinates are accurate ±2 meters. The mapping system may indicate that the accuracy is limited to ±1.5 meters. The offset may be calculated as the extremes (i.e., largest possible and smallest possible) offsets based on the reported accuracies. The offset value used for correction may be the largest possible offset, the middle or average offset, or the smallest possible offset based on the difference between the GPS coordinates and the reported accuracies.

The corrected values can be used to display the UAV in the correct location relative to satellite images, ensure the correct portion of the structure is scanned, and/or associate captured sensor data (e.g., images, moisture readings, infrared images, etc.) with locations on the satellite images. For instance, accurate coordinate information may be important for navigation and obstacle avoidance. Captured images may be associated with the GPS coordinates from the UAV. For instance, if such UAV-captured images are later used in association with satellite based images, the coordinate offset may be used to ensure subsequent visual alignment.

In various embodiments, the flight pattern may include one or more of three flight stages: (1) a boustrophedonic scan, (2) a loop scan, and (3) a micro scan. In some embodiments, a structural assessment may require only one or two of the three types of scans. In some embodiments, one or more stages may be omitted. For instance, in some situations an autonomous or semi-autonomous micro scan may be sufficient.

During a first scan stage, the UAV may perform a boustrophedonic scan. During the boustrophedonic scan, the UAV may follow a flight pattern where the UAV travels from edge to edge of the site in alternating offset zones. The camera on the UAV may capture images of the site as the UAV travels in its boustrophedon pattern. The UAV assessment and reporting system may merge the images to form a detailed aerial view of the site. The level of detail in the detailed aerial view may be improved by lowering the altitude of the UAV and using minimal offsets. However, the altitude used for a boustrophedonic scan may be limited due to the height of structures and obstacles on the site.

In some embodiments, the boustrophedonic scan alone may be used to develop a top-down or aerial view of the site, structure, property, etc. In other embodiments, the images and scan information obtained during the boustrophedonic scan may be combined with other available data or used to refine other available data. The scan information may, as previously described, include information from optical imaging systems, ultrasonic systems, radar, lidar, infrared imaging, moisture sensors, and/or other sensor systems.

During a second scan stage, the UAV may perform a loop scan to analyze the angles of a structure. The loop scan may include a flight pattern that positions the UAV at the perimeter of the structure and/or the site. The loop scan may include the UAV traveling around the perimeter. As the UAV travels around the perimeter, the UAV may lower its altitude and the camera captures images of the structure at one or more angles. The angles may be oblique or perpendicular to the walls of the structure. The UAV assessment and reporting system may use these images to create a three-dimensional model of the structure. In one embodiment, the UAV may make multiple passes around the perimeter of the structure at different altitudes.

For example, the UAV may fly around the perimeter at a first altitude to capture images of the structure at a first angle, and then fly around the perimeter at a second altitude to capture additional images of the structure at a second angle. The number of passes around the perimeter and the lowering of UAV altitude after each pass may vary based on a desired assessment or report. Each additional pass may provide more accurate structural images for a three-dimensional model, construction assessment, solar panel installation assessment, and/or damage assessment.

During a third scan stage, the UAV may perform a micro scan for close-up photos of a structure or other areas of interest. The micro scan over the surface of the structure (e.g., and exterior surface or features) may provide detailed images for assessing the structure and/or other personal property. The granularity from the micro scan may assist in detailed measurements, damage identification, and material identification. For example, the micro scan may allow an insurance adjuster to zoom in on a three-dimensional model of the structure to view and assess a small patch of roof that has been damaged, identify a stucco color or a material of a structure, etc.

One or more of the stages may be performed multiple times, or even omitted from the process. For example, in one embodiment the flight pattern may include a boustrophedonic scan. Information gained during the boustrophedonic scan may be used to perform a loop scan. Information gained during the loop scan may be used to perform a more accurate boustrophedonic scan. That process may be repeated as many times as is desired or necessary to obtain sufficient information about a property or structure to perform a suitably detailed or accurate micro scan.

In one embodiment, to perform the micro scan, the UAV may perform a series of vertical approaches near the structure. During the micro scan, the UAV may utilize a base altitude that is higher than at least a portion of the structure or other personal property of interest. The UAV may begin in a starting position at the base altitude and lower its altitude until it is at a target distance from the structure. In one embodiment, the camera on the UAV may capture an image when the target distance is reached. In another embodiment, the camera may take a set of images as the UAV lowers in altitude. After the image at the target distance is captured, the UAV may return to the base altitude and travel a target lateral distance and once again lower its altitude until it is at a target distance from the structure. The target lateral distance may be determined based on the area of the structure captured by each image. In some embodiments, the images may slightly overlap to ensure coverage of the entire structure. The UAV may continue to perform vertical approaches separated by the target lateral distance until the entire structure has been covered or a specified portion of the structure has been assessed.

In another embodiment, to perform the micro scan, the UAV may traverse the surface of a structure or other personal property at a target lateral distance and the camera may capture images as the UAV travels in a boustrophedonic or circular pattern. To avoid a collision, the UAV may use the angled images from the loop scan to determine any slope or obstacle on the surface.

In one embodiment, the UAV may include proximity sensors. The proximity sensors may be used to avoid obstacles on and surrounding the structure and thereby identify safe flight areas above and proximate the structure and surrounding objects. The safe flight areas are locations where the UAV may fly very close to the structure and capture images. The proximity sensors may also be used to determine how close the UAV is to the structure. For example, a UAV may be programmed to capture images at a distance of five feet from the structure. The proximity sensors may send a signal indicating to the UAV that it has reached the target distance, five feet, and the camera may take a photograph in response to the signal. The target distance may be adjusted based on desired detail, weather conditions, surface obstacles, camera resolution, camera field of view, and/or other sensor qualities. In some embodiments, infrared and other non-optical sensors may be used to provide additional assessment data. For example, materials may be identified based on a spectral analysis and/or damage may be identified based on infrared leaks in a structure.

In other embodiments, the UAV may use additional and/or alternative methods to detect proximity to obstacles and the structure. For example, the UAV may use topographical data. As another example, the UAV may have a sonar system that it uses to detect proximity. As yet another example, the UAV may determine the proximity to the structure based on the angled images from the loop scan. For instance, the UAV assessment and reporting system may calculate the height of walls based on the angled images and determine an altitude that is a target distance above the height of the walls to descend for each image capture.

The location of the micro scan may be determined in a variety of ways. In one embodiment, the micro scan may include an assessment of the entire structure as identified by the operator. In another embodiment, the micro scan may include an assessment of only a portion of interest identified by the operator. For example, for a solar panel installation or construction assessment on or near a structure, a micro scan and/or loop scan may be needed for only a portion of the structure. In yet another embodiment, the UAV assessment and reporting system may intelligently identify portions of interest during one or both the first two scanning stages and only micro scan those areas.

Additionally, in some embodiments, the UAV assessment and reporting system may perform multiple micro scans with different levels of resolution and/or perspective. For example, a first micro scan may provide detailed images at 10 or 20 feet above a roof. Then a second micro scan may image a portion of the roof at five feet for additional detail of that section. This may allow a faster capture of the roof overall while providing a more detailed image set of a portion of interest. In one embodiment, the UAV assessment and reporting system may use the first micro scan to determine the portion to be imaged in the second micro scan.

In some embodiments, the UAV assessment and reporting system may use each scan stage to improve the next scan stage. For example, the first scan stage may identify the location of objects. Sonar or optical sensors may be used in the first scan stage to identify the height of the objects and/or physical damage. The location and height of the objects identified in the first scan stage may determine where the loop scan occurs and the altitude at which the angled photographs are taken. Further, the first and second stages may identify particular points of interest. The third stage may use the particular points of interest to determine the location of the micro scans. For example, during a loop scan, the autonomous flying system may identify wind damage on the east surface of a structure. The micro scan may then focus on the east surface of the structure. The identification of particular points of interest may be done using UAV onboard image processing, server image processing, or client image processing.

The UAV assessment and reporting system may automatically calculate a pitch of a roof. In a first embodiment, the UAV assessment and reporting system may use the UAV's sonar or object detection sensors to calculate the pitch of the roof. For example, the UAV may begin at an edge of the roof and then travel toward the peak. The pitch may then be calculated based on the perceived Doppler effect as the roof becomes increasingly closer to the UAV as it travels at a constant vertical height. In a second embodiment, the UAV may land on the roof and use a positioning sensor, such as a gyroscope, to determine the UAV's orientation. The UAV assessment and reporting system may use the orientation of the UAV to determine the slope.

In some embodiments, a UAV may hover above the roof but below a peak of the roof. Sensors may determine a vertical distance to the roof below and a horizontal distance to the roof, such that the roof represents the hypotenuse of a right triangle with the UAV positioned at the 90-degree corner of the right triangle. A pitch of the roof may be determined based on the rise (vertical distance downward to the roof) divided by the run (horizontal forward distance to the roof).

In some embodiments, a UAV may hover above the roof at a first location and measure a vertical distance from the UAV to the roof (e.g., downward). In one such embodiment, a downward sensor may be used. The UAV may then move horizontally to a second location above the roof and measure the vertical distance from the UAV to the roof. Again, the roof becomes the hypotenuse of a right triangle, with one side of the triangle corresponding to the horizontal difference between the first location and the second location, and the second side of the triangle corresponding to the vertical difference between the distance from the UAV to the roof in the first location and the distance from the UAV to the roof in the second location.

In some embodiments, a UAV may hover above the roof at a first location and measure a horizontal distance from the UAV to the roof. In such embodiments, a forward, lateral, and/or reverse sensor may be used. The UAV may then move vertically to a second location above the roof and measure the horizontal distance from the UAV to the roof. Again, the roof becomes the hypotenuse of a right triangle, with one side of the triangle corresponding to the vertical difference between the first location and the second location, and the second side of the triangle corresponding to the horizontal difference between the distance from the UAV to the roof in the first location and the distance from the UAV to the roof in the second location.

In some embodiments, the UAV assessment and reporting system may use three or more images and metadata associated with those images to calculate the pitch of the roof. For example, the UAV may capture a first image near the roof. The UAV may then increase its altitude and capture a second image above the first image. The UAV may then fly laterally towards the peak of the roof until the proximity of the UAV to the roof is the same as the proximity of the first image. The UAV may then capture a third image. Each image may have metadata associated with it including GPS coordinates, altitude, and proximity to the house. The UAV assessment and reporting system may calculate the distance of the roof traveled based on the GPS coordinates and altitude associated with the three images using the Pythagorean theorem. The UAV assessment and reporting system may then calculate the pitch by taking the ratio of the altitude and the distance of the roof traveled.

In some embodiments, to maintain stationary a UAV may have to tilt the body and/or one or more propellers to compensate for wind or other environmental factors. For various measurements and scans described herein, the images, measurements, and/or other captured data may be annotated to identify the tilt or angle caused by the UAV tilt. In other embodiments, the sensors, cameras, and other data capture tools may be mechanically or digitally adjusted, such as gyroscopically, for example. In some embodiments, measurements, such as distances when calculating skew and/or roof pitch, may be adjusted during calculations based on identified UAV tilt due to environmental factors.

The UAV may use the calculated pitch to adjust the angle of the camera to reduce image skew during a micro scan and/or loop scan. For example, once the pitch is calculated the UAV may perform a micro scan with the camera at a perpendicular angle to the roof and/or de-skew the image using software on the UAV, during post-imaging processing, and/or through cloud-based processing. In various embodiments, the calculated pitch is used to angle the camera so it is perpendicular to the roof to eliminate skew.

In some embodiments, a pitch determination system may determine a pitch of the roof based on at least two distance measurements, as described above, that allow for a calculation of the pitch. An imaging system of the UAV may capture an image of the roof of the structure with the optical axis of the camera aligned perpendicular to a plane of the roof of the structure by adjusting a location of the UAV relative to a planar surface of the roof and/or a tilt angle of the camera of the UAV.

The UAV assessment and reporting system may also reduce and/or identify shadows in the images by calculating the current angle of the sun. The UAV assessment and reporting system may calculate the angle of the sun based on the time of the day, the day of the year, and GPS location. To eliminate the UAV's shadow from appearing in captured images, the UAV assessment and reporting system may apply the angle of the sun to the current UAV position in flight. The UAV position, the angle/position of the sun, and the relative location of surfaces and structures (e.g., roof) may determine precisely where the shadow of the UAV will appear. The UAV may adjust its position and camera based on the location of the roof shadow to ensure that each photograph will be captured in such a way as to completely eliminate the UAV's shadow.

In some embodiments, the UAV assessment and reporting system may also use the angle of the sun to determine the best time of day to photograph a site or portion of a site. For example, the shadow of an object on a site may obscure a structure during the morning. Based on the angle of the sun, the UAV assessment and reporting system may determine what time of day the shadow would no longer obscure the structure. The UAV may autonomously collect images during different times of day to ensure that shadow-free images of all, most, or specific portions of the structure are captured during boustrophedonic, loop, and/or micro scans. The processes described herein are repeatable on a consistent basis for various properties and structures and are therefore aptly characterized as systematic.

For example, a UAV assessment system for imaging a structure may utilize a site selection user interface to receive an electronic input from a user identifying a geographic location of a structure, as previously described. The selection may, for example, be based on one or more of a user input of a street address, a coordinate, and/or a satellite image selection. The UAV may utilize one or more cameras to image the structure (multiple cameras may be used to capture three-dimensional images if desired). A shadow determination system (onboard or cloud-based) may calculate a location of a shadow of the UAV on the structure based on the relative position of the UAV and the sun. A shadow avoidance system may adjust a location of the UAV as it captures images of the structure to ensure that the shadow of the UAV is not in any of the images.

In other embodiments, as described above, the UAV may include a proximate object determination system to identify at least one object proximate the structure, such as a tree, telephone pole, telephone wires, other structures, etc., that are proximate the structure to be imaged. A shadow determination system (local or remote) may calculate (as opposed to directly observe) a location of a shadow cast by the proximate object onto the structure based on a current location of the sun, which can be accurately determined based on a current time and a GPS location of the structure. The imaging system may account for the shadow by (1) annotating images of the structure that include the calculated shadow, (2) adjusting an exposure of images of the structure that include the calculated shadow, and/or (3) identifying a subsequent time to return to the structure to capture non-shadowed images of the portions of the structure that are currently shadowed.

The UAV, server, and operator client may be connected via one or more networks. For example, the UAV may transmit images to the server via a cellular network. Additionally, the UAV may connect to the client via a second network such as a local wireless network. The UAV, server, and operator client may each be directly connected to each other, or one of the elements may act as a gateway and pass information received from a first element to a second element.

A standard flight plan may be saved on the server. The standard flight plan may be loaded on the UAV and altered based on information entered by the operator into the operator client interface. The UAV (e.g., via onboard or cloud-based processors) may also alter the standard flight plan based on the images captured and/or other sensor data.

In some embodiments, one or more of three flight stages alone or in combination may be used to generate all or part of a navigational risk zone. A navigational risk zone may be associated with a property, such as a structure, vehicle, land, livestock, equipment, farm, mine, etc. The navigational risk zone may include some or all the area within which an autonomous vehicle, such as a UAV, may navigate to perform micro scans of the property. For example, a rectangular office building may be associated with a navigational risk zone represented by an envelope surrounding the office building, where the envelope represents a region within which the UAV may need to navigate during a loop or micro scan stage of an analysis.

The navigational risk zone may include one or more navigational risk tags associated with specific locations relative to the property. For example, if a tree is identified as having branches overhanging some portions of the navigational risk zone, the portions below the overhanging branches may be tagged with a navigational risk tag indicating that an obstruction is overhead. A navigational risk tag may simply indicate the existence of the overhead obstruction. Alternatively, the navigational risk tag may provide additional detail, such as distance from the current location to the obstruction, the type of obstruction, or even a flight pattern modification to avoid the obstruction.

A navigational risk tag may include a wide variety of warnings, notices, or other relevant information for the location. Examples of a navigational risk tag include, but are not limited to: identification of standing water that may make sensor readings inaccurate, an obstruction that is more easily seen or detected from some vantage points than others (e.g., a net or wire), a feature or characteristic of the property that may be subsequently misidentified (e.g., a skylight might be mistaken as standing water on a roof and erroneously scanned), a feature or characteristic of the property that may necessitate addition or more careful scanning, high-value items that should be avoided by a set distance (e.g., a car in a driveway), and/or other tags.

A UAV system may include onboard processing, onboard storage, communications systems, access to cloud-based processing, and/or access to cloud-based storage. The system may utilize one or more of these resources to analyze, image, and/or otherwise scan the property. In some embodiments, the system may utilize computer vision in combination with a library of images for identifying properties, characteristics of properties, problems, defects, damage, unexpected issues, and the like.

The inclusion of computer vision intelligence may be adapted based on the use of computer vision in other fields and in its general form for use in UAV structural and property analysis. Computer visional analysis may include various systems and methods for acquiring, processing, analyzing, storing, and understanding captured images. The system may include digital and analog components, many of which may be interchangeable between analog and digital components. Computer vision tasks may be performed in the cloud or through onboard processing and storage. The computer vision system of the UAV may execute the extraction of high-dimensional data from captured images (optical, infrared, and/or ultraviolet) and other sensor data to produce numerical or symbolic information.

The computer vision systems may extract high-dimensional data to make decisions based on rule sets. As such, a rule-based structural analysis of buildings, vehicles, and other property may be performed in a systematic, uniform, and repeatable manner. The computer vision systems may utilize images, video sequences, multi-dimensional data, time-stamped data, and/or other types of data captured by any of a wide variety of electromagnetic radiation sensors, ultrasonic sensors, moisture sensors, radioactive decay sensors, and/or the like.

Part of the analysis may include profile matching by comparing captured sensor data with data sets from a library of identifiable sensor profiles. An evaluator module or system may be responsible or partially responsible for this analysis and the analysis may be locally performed or performed in the cloud. For example, images of different types of shingles (e.g., asphalt, cedar, and clay) may be used to determine which type of shingle is on a structure being analyzed. Upon a determination that the shingles are asphalt, the system may compare captured images of the asphalt shingles on the structure with a library of defects in asphalt shingles to identify such defects.

As another example, a thermal scan of asphalt shingles in a region of a structure may reveal a thermal profile data set that can be compared with a library of thermal profiles. A matched profile may be used to determine that the roof is undamaged, damaged, aging, poorly constructed, etc. In some embodiments, a first sensor system may be used and, if a matched profile is found, the system may follow a rule set to take a subsequent action that is different from the action that would have been taken if no matched profile had been found. An evaluator system or module (hardware, firmware, or software) may evaluate various inputs to make a decision.

In one example embodiment, an optical scan may be used to match profiles within the library that indicate that a portion of the structure may have a particular characteristic (e.g., damage, manufacturing material, construction material, construction methods, modification from prior specification, etc.). A rule set may dictate that based on the matched profile within the library that another type of sensor system be used for a subsequent scan and/or if a scan with increased resolution or detail is warranted.

As described herein, a micro or detailed scan, loop scan, or other type of scan is more than a manual scan that is susceptible to user error and variation from scan to scan. Moreover, the micro or detailed scans described herein are more than a mere automatic or programmed scan performed according to a defined pattern. The utilization of computer vision and/or a library of sensor data profiles allows for a dynamic and adaptive system that can respond in real time according to a rule set. As such, the UAV system described herein allows for an autonomous and adaptive system that can conduct an analysis in a repeatable, uniform, consistent, and detailed manner. Yet, the system's ability to adapt based on a rule set in response to matched data profiles allows for increased scan speeds without undue sacrifice of accuracy or consistency.

For instance, during a micro scan, scan data may be determined to have a particular characteristic (e.g., construction material) and a rule set may dictate that for the particular characteristic a supplemental sensor system should be used to enhance the scan data. By not using the supplemental sensor system for the entire micro scan, the time to conduct the micro scan may be reduced without sacrificing accuracy or consistency because the supplemental sensor system would be used when needed.

In some embodiments, a three-dimensional representation of the property (e.g., a structure) may be presented to a user. The user may click on a location on the three-dimensional representation to view micro scans from one or more sensor types and/or information relevant to a particular user. For example, an engineer or inspector may value specific types of information that is different from other entities, such as underwriters, real estate agents, appraisers, claimants, etc. The system may present different data sets and conclusions to each type of entity based on expected utility. In various embodiments, some information may be intentionally withheld and/or unavailable to certain types of entities based on access privileges.

Some of the infrastructure that can be used with embodiments disclosed herein is already available, such as: general-purpose computers, computer programming tools and techniques, digital storage media, and communications networks. A computer may include a processor, such as a microprocessor, microcontroller, logic circuitry, or the like. The processor may include a special-purpose processing device, such as an ASIC, a PAL, a PLA, a PLD, a CPLD, a Field Programmable Gate Array (FPGA), or other customized or programmable device. The computer may also include a computer-readable storage device, such as non-volatile memory, static RAM, dynamic RAM, ROM, CD-ROM, disk, tape, magnetic memory, optical memory, flash memory, or other computer-readable storage medium.

Suitable networks for configuration and/or use, as described herein, include any of a wide variety of network infrastructures. Specifically, a network may incorporate landlines, wireless communication, optical connections, various modulators, demodulators, small form-factor pluggable (SFP) transceivers, routers, hubs, switches, and/or other networking equipment.

The network may include communications or networking software, such as software available from Novell, Microsoft, Artisoft, and other vendors, and may operate using TCP/IP, SPX, IPX, SONET, and other protocols over twisted pair, coaxial, or optical fiber cables; telephone lines; satellites; microwave relays; modulated AC power lines; physical media transfer; wireless radio links; and/or other data transmission "wires." The network may encompass smaller networks and/or be connectable to other networks through a gateway or similar mechanism.

Aspects of certain embodiments described herein may be implemented as software modules or components. As used herein, a software module or component may include any type of computer instruction or computer-executable code located within or on a computer-readable storage medium, such as a non-transitory computer-readable medium. A software module may, for instance, comprise one or more physical or logical blocks of computer instructions, which may be organized as a routine, program, object, component, data structure, etc., that perform one or more tasks or implement particular data types, algorithms, and/or methods.

A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Further, those of skill in the art will recognize that one or more of the specific details may be omitted, or other methods, components, or materials may be used. In some cases, operations are not shown or described in detail. Thus, the following detailed description of the embodiments of the systems and methods of the disclosure is not intended to limit the scope of the disclosure, as claimed, but is merely representative of possible embodiments.

Figure 1A:
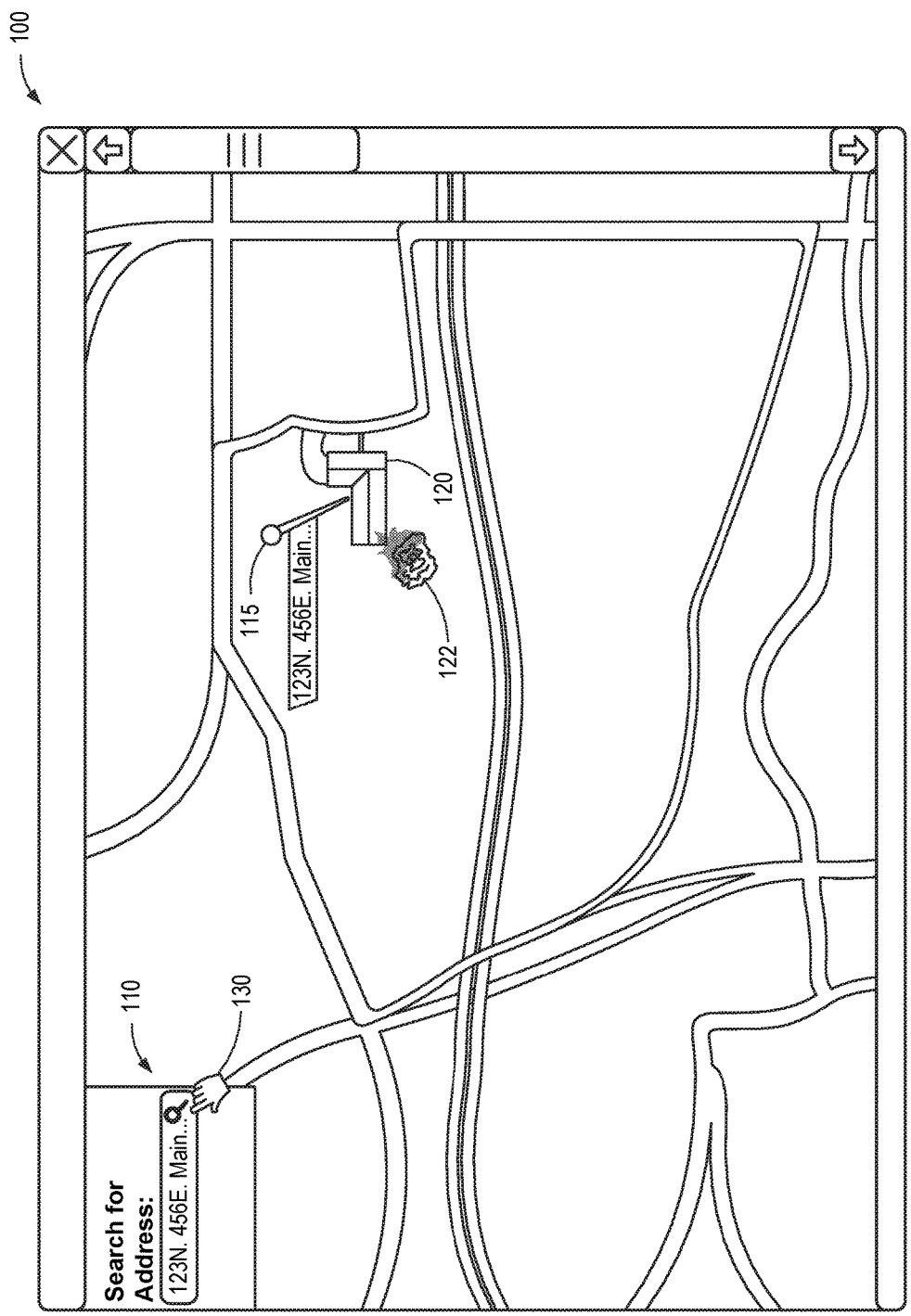
FIG. 1A illustrates a site selection interface to receive an electronic input identifying a location of a structure, according to one embodiment.

FIG. 1A illustrates a site selection interface 100 to receive an electronic input 110 identifying a location 115 of a structure 120. A client device may present the site selection interface 100 to an operator, and the operator may identify the location 115 by entering an address and selecting 130 the search function. As shown, the electronic input 110 may be an address entered by an operator. In another embodiment, the operator may enter GPS coordinates. In yet another embodiment, the operator may select the location 115 with a gesture or based on a selection within the map view.

The site selection interface 100 may also receive an electronic input 110 identifying any obstacles 122. For example, an operator may identify a tree, a shed, telephone poles, or other obstacle using a gesture within the site selection interface 100. In some embodiments, the site selection interface 100 may request an estimated height of the obstacle 122. In other embodiments, the site selection interface 100 may request the object type then estimate the height of the obstacle 122 based on the object type. For instance, a standard telephone pole is 40 feet tall. If an operator identified an obstacle 122 on the site to be a telephone pole, the site selection interface 100 may estimate the height to be 40 feet.

Figure 1B:
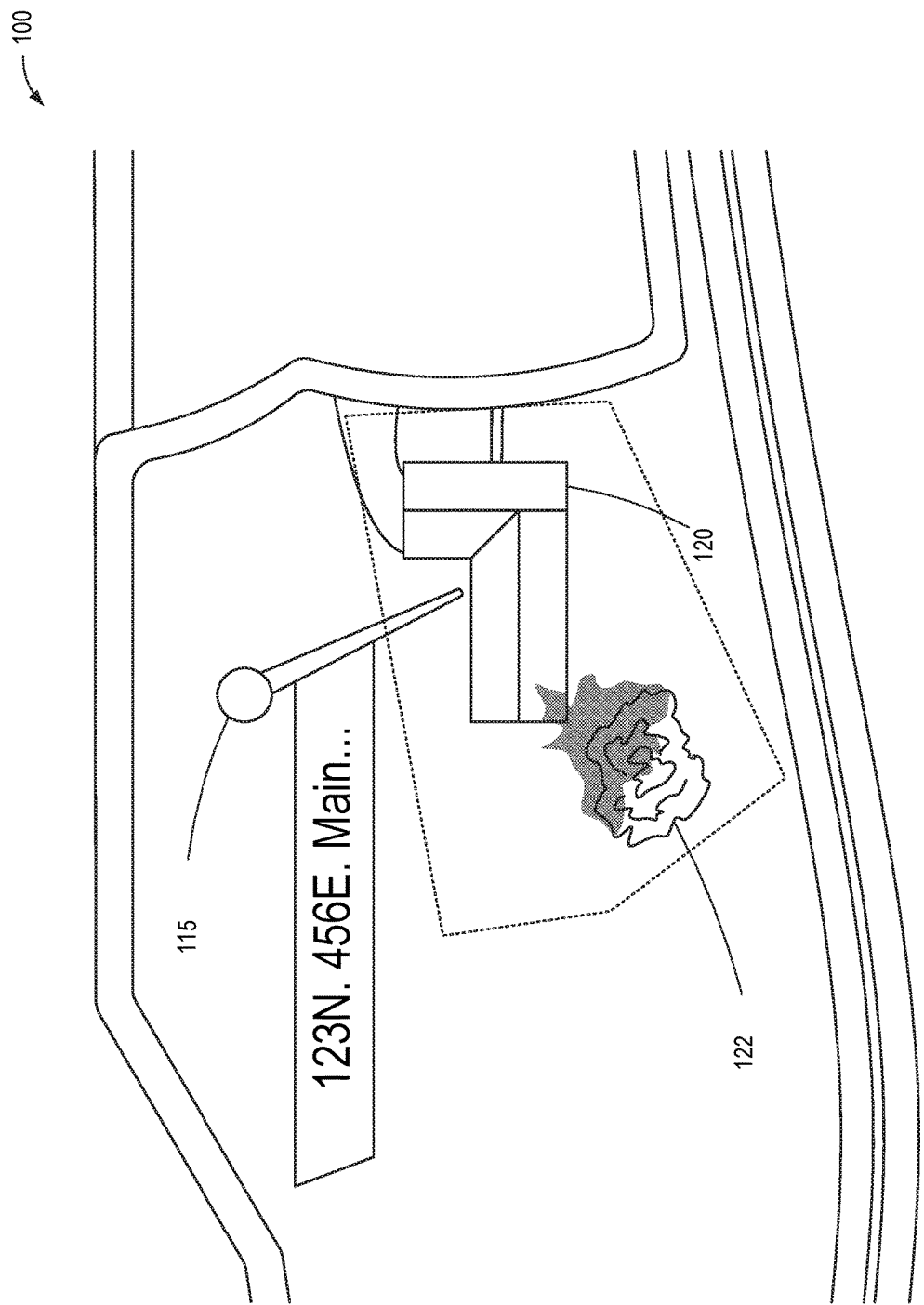
FIG. 1B illustrates parcel boundaries associated with the location identified in FIG. 1A, according to one embodiment.

FIG. 1B illustrates parcel boundaries associated with the location 115 identified in FIG. 1A. In various embodiments, parcel information may be determined using aerial photos, satellite images, government records, plot maps, and/or the like.

Figure 2A:
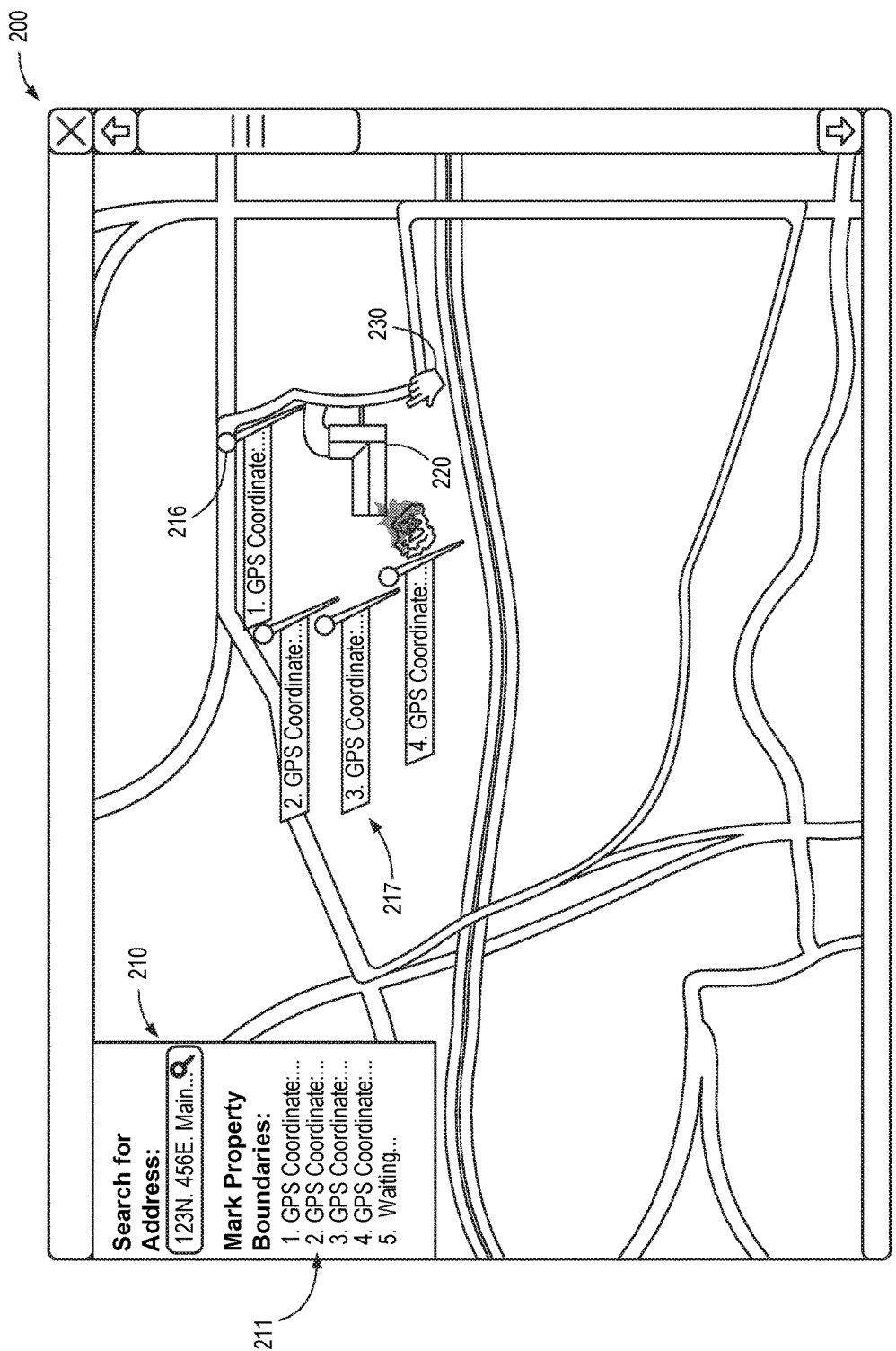
FIG. 2A illustrates a boundary identification interface to receive electronic input identifying geographic boundaries of an area that includes the structure, according to one embodiment.

FIG. 2A illustrates a boundary identification interface 200 to receive electronic input 230 identifying geographic boundaries 217 of an area that includes a structure 220. The geographic boundaries 217 provide an area for the UAV assessment and reporting system to analyze.

To enter the geographic boundaries 217 of the area, an operator may provide electronic input 230 identifying a location on the boundary identification interface 200. As shown, the electronic input 230 may be a mouse click. The electronic input 230 may also be a gesture entered via a touch screen. Additionally, the operator may enter an address or GPS coordinate in an address bar 210.

The electronic inputs 230 provided by the operator may be marked with a pin 216. The pins 216 may be associated with GPS coordinates, and may be placed in corners of the site. The boundary identification interface 200 may automatically form a boundary line between each pin 216. The placement of the pins 216 may be adjusted through the electronic input 230. For example, the operator may select and drag a pin 216 to a new location if the old location was inaccurate. The boundary identification interface 200 may also display the placement of the current pin 216 in a preview window 211.

Figure 2B:
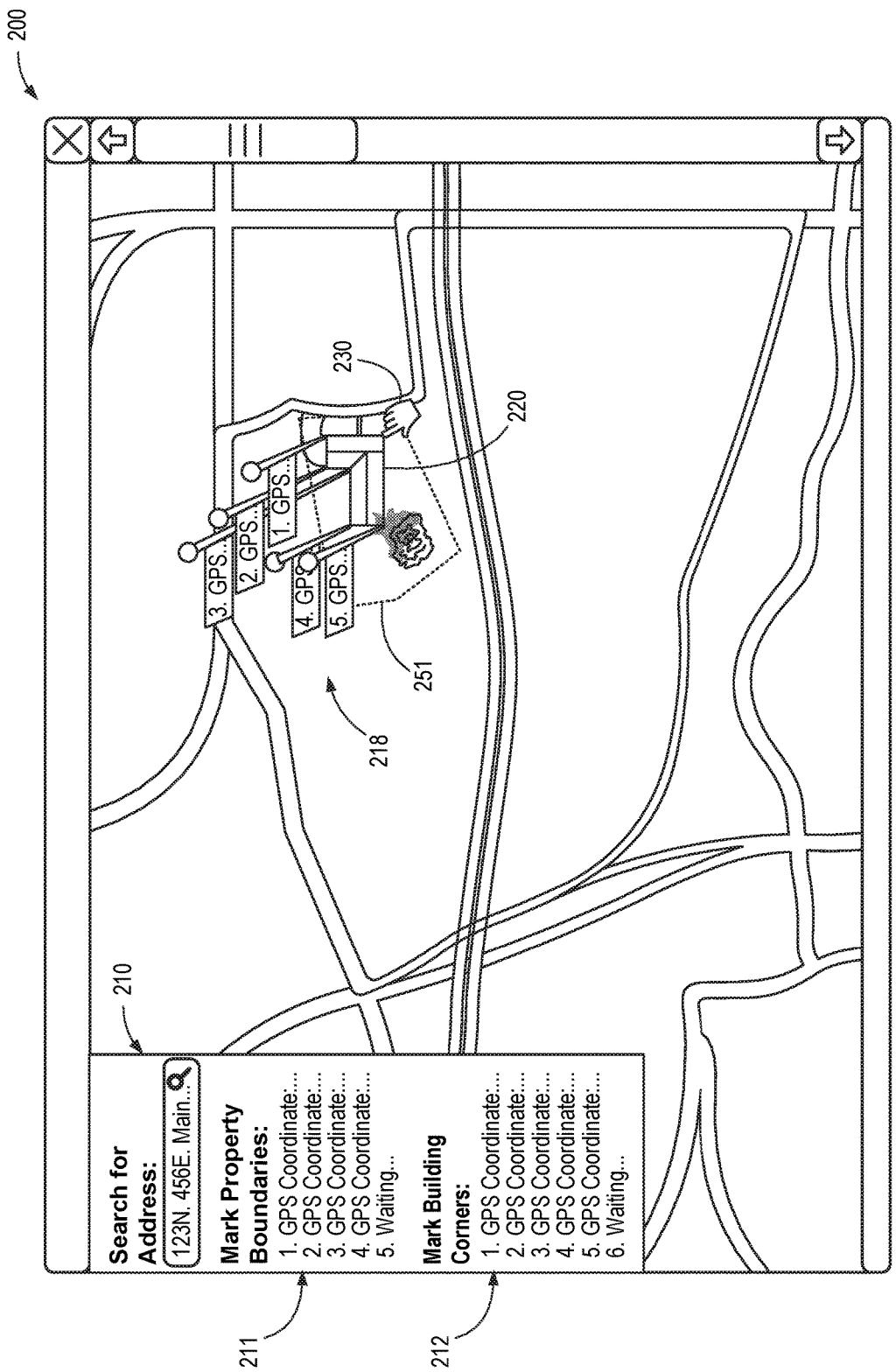
FIG. 2B illustrates a structure identification interface, according to one embodiment.

FIG. 2B illustrates a structure identification interface 200 to receive electronic input 230 identifying structural boundaries 218 of a structure 220. The structural boundaries 218 identify the corners of the structure 220 for the UAV assessment and reporting system to analyze.

To enter the structural boundaries of the structure 220, an operator may provide electronic input 230 identifying a location on the structure identification interface 200. As shown, the electronic input 230 may be a mouse click. The electronic input 230 may also be a gesture entered via a touch screen. Additionally, the operator may enter an address or GPS coordinate in an address bar 210.

Boundary lines 250 formed by the boundary identification interface 200 of FIG. 2A may be displayed on the structure identification interface 200. In some embodiments, any electronic input allowed to be entered in the structure identification interface 200 is limited to the area within the boundary lines 250. In other embodiments, the structure identification interface 200 may present an alert if a structural boundary 218 is located outside of the boundary lines 251. In yet other embodiments, the structure identification interface 200 may adjust the boundary lines 251 if a structural boundary 218 is located outside of the boundary lines 251. The structure identification interface 200 may also display a current property boundary 211.

The electronic inputs 230 provided by the operator may be marked with pins. The pins may be associated with GPS coordinates, and may be placed in corners of the site. The structure identification interface 200 may automatically form a boundary structure line between each pin. The placement of the pins may be adjusted through the electronic input 230. For example, the operator may select and drag a pin to a new location if the old location was inaccurate. The structure identification interface 200 may also display the current pin placement in a preview window 212.

Figure 2C:
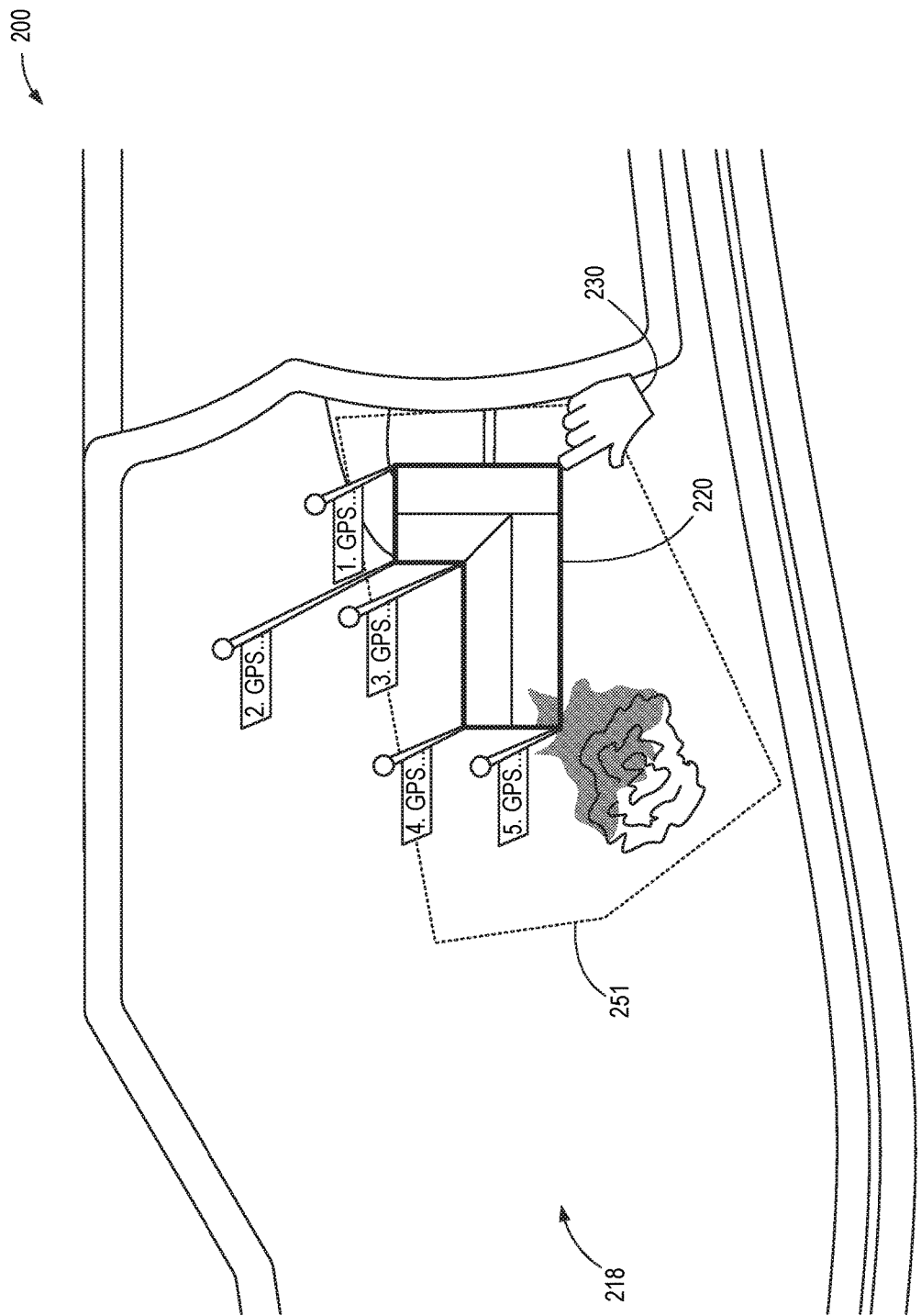
FIG. 2C illustrates a close-up view of the parcel boundaries and the structure identified in FIG. 2B, according to one embodiment.

FIG. 2C illustrates a close-up view of the boundary lines 251 and the structure 220 identified in FIG. 2B by GPS markers. The structure 220, which may be partially or fully defined by the operator, is illustrated in bold lines. In some embodiments, the system may utilize the markers in combination with an image (e.g., aerial or satellite) to intelligently identify the structure 220. In other embodiments, an operator of the system may fully identify the outline of the structure 220.

Figure 3A:
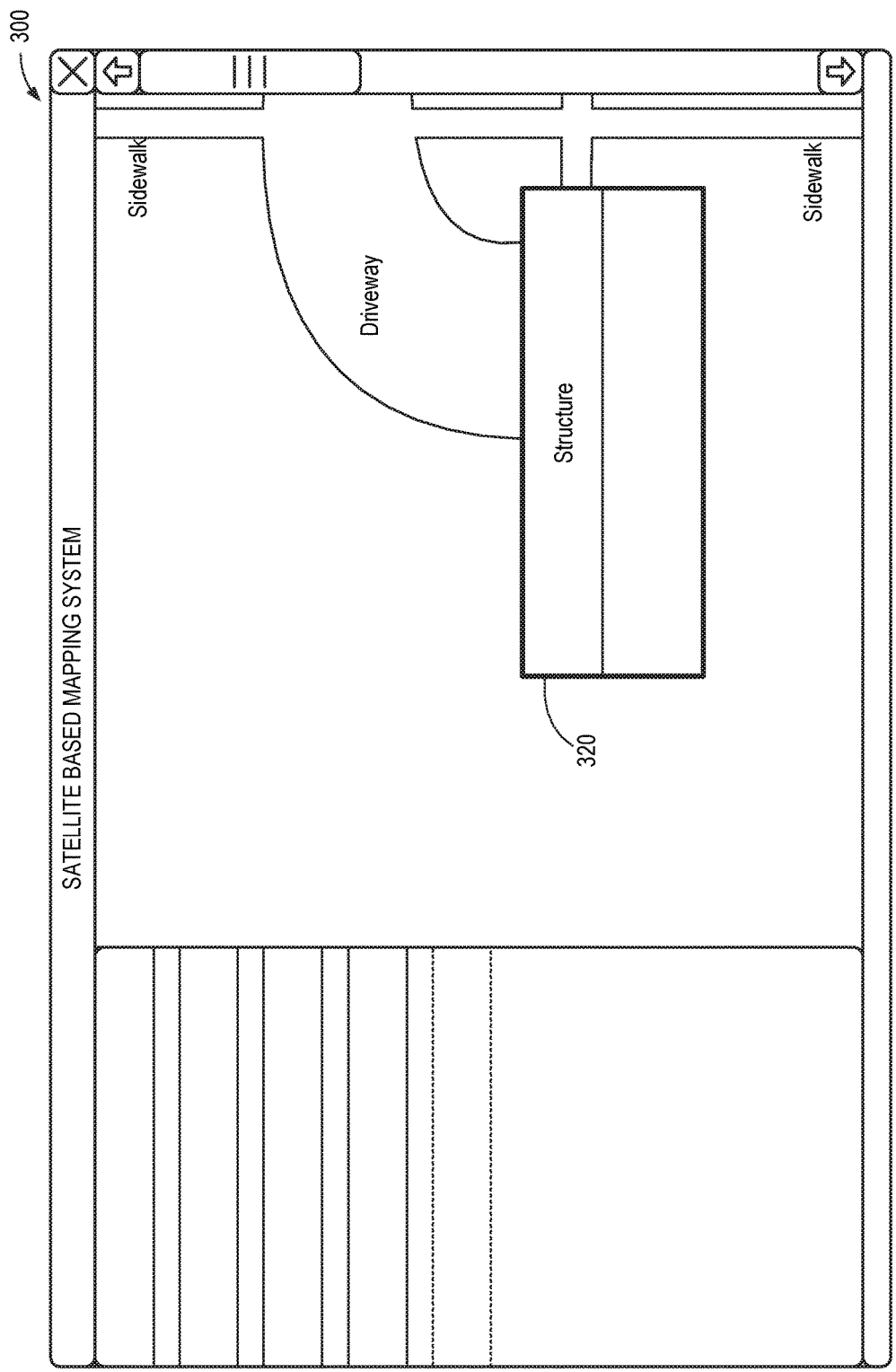
FIG. 3A illustrates a rooftop, sidewalk, and driveway of a structure, according to one embodiment.

FIG. 3A illustrates a rooftop, sidewalk, and driveway of a structure 320 provided via a satellite based mapping system or geographic information system (GIS) 300, according to one embodiment. For example, the interface in FIG. 3A may utilize satellite imagery from OpenStreetMap, Google Maps, Google Earth, Apple Maps, Here, Waze, Navmii, MapQuest, Yahoo! Maps, Bing, WikiMapia, Nokia Maps, Rand McNally Maps, USGS Data, and/or the like. In various embodiments, each location on the satellite image 300 may be associated with global positioning system (GPS) coordinates in decimal degrees (DD), degrees, minutes, seconds (DMS), or degrees and decimal minutes (DDM).

However, in some instances, the displayed satellite image 300 from the GIS may not be perfectly aligned with the actual GPS coordinates. In most instances, the offset of the displayed satellite image and the actual GPS coordinates can be assumed to be constant for a small displayed region, such as a structure, land parcel, or other property (e.g., a car or industrial equipment). Thus, in some embodiments of the presently described systems and methods, a GPS offset may be calculated between an actual UAV location and mapping system perceived UAV location. The system may use the offset value to adjust and/or correct displayed images and/or user-input coordinates.

Figure 3B:
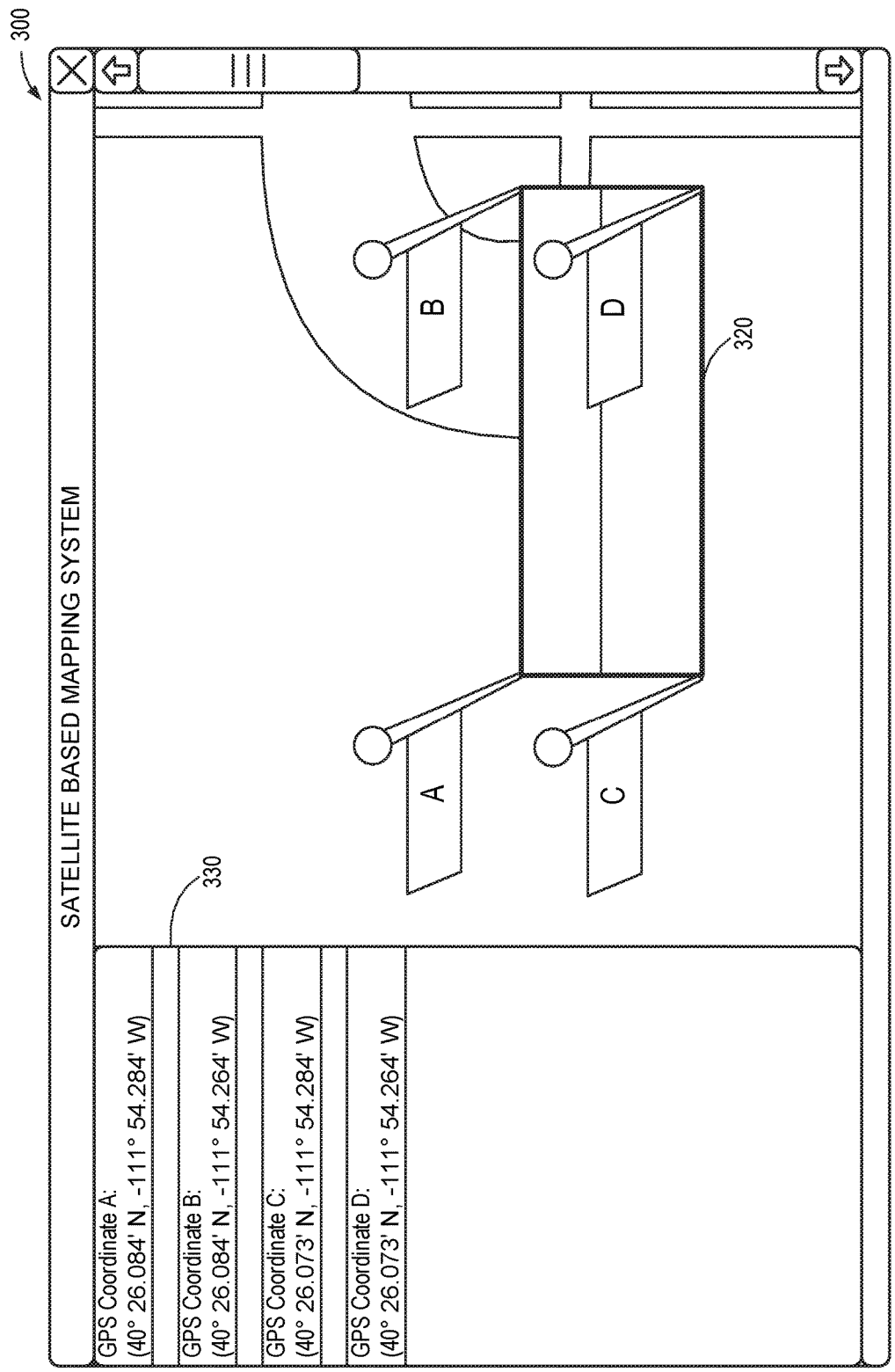
FIG. 3B illustrates a user-annotated rooftop designating an area for scan using a mapping system to add GPS markers to the corners of a rooftop, according to one embodiment.

FIG. 3B illustrates a user-annotated rooftop designating an area for scanning using the mapping system satellite image 300 to add GPS markers A, B, C, and D to the corners of a rooftop, according to one embodiment. The illustrated embodiment includes a user interface 300 showing a satellite view of a property including a structure 320, driveway, and sidewalk. An operator may use a stylus or finger (or other input device) to select a corner A of the structure 320. GPS coordinates associated with the corner A are noted in a coordinate panel 330 on the left side of the user interface as 40° 26.084' N, −111° 54.284'. Similar coordinates have been identified for each of GPS markers B, C, and D of the structure 320 in the coordinate panel 330.

The corners A-D may be marked by a user to initiate one or more of the scans described herein by a UAV. The UAV may be configured to overscan a target region by a predetermined amount to account for the inherent inaccuracy of GPS coordinates. However, if the mapping system or other GIS inaccurately displays the satellite image relative to assigned GPS coordinates with too large of an offset between the display and reality, erroneous scans may fail to include the target structure or correct portion(s) of the structure. This could be particularly problematic for partial scans, such as a scan of a chimney. For example, if a chimney is identified using a mapping system that is offset by three meters, the scan may completely omit the chimney. Accordingly, systems and methods described herein may account for and correct for a calculated offset.

Figure 3C:
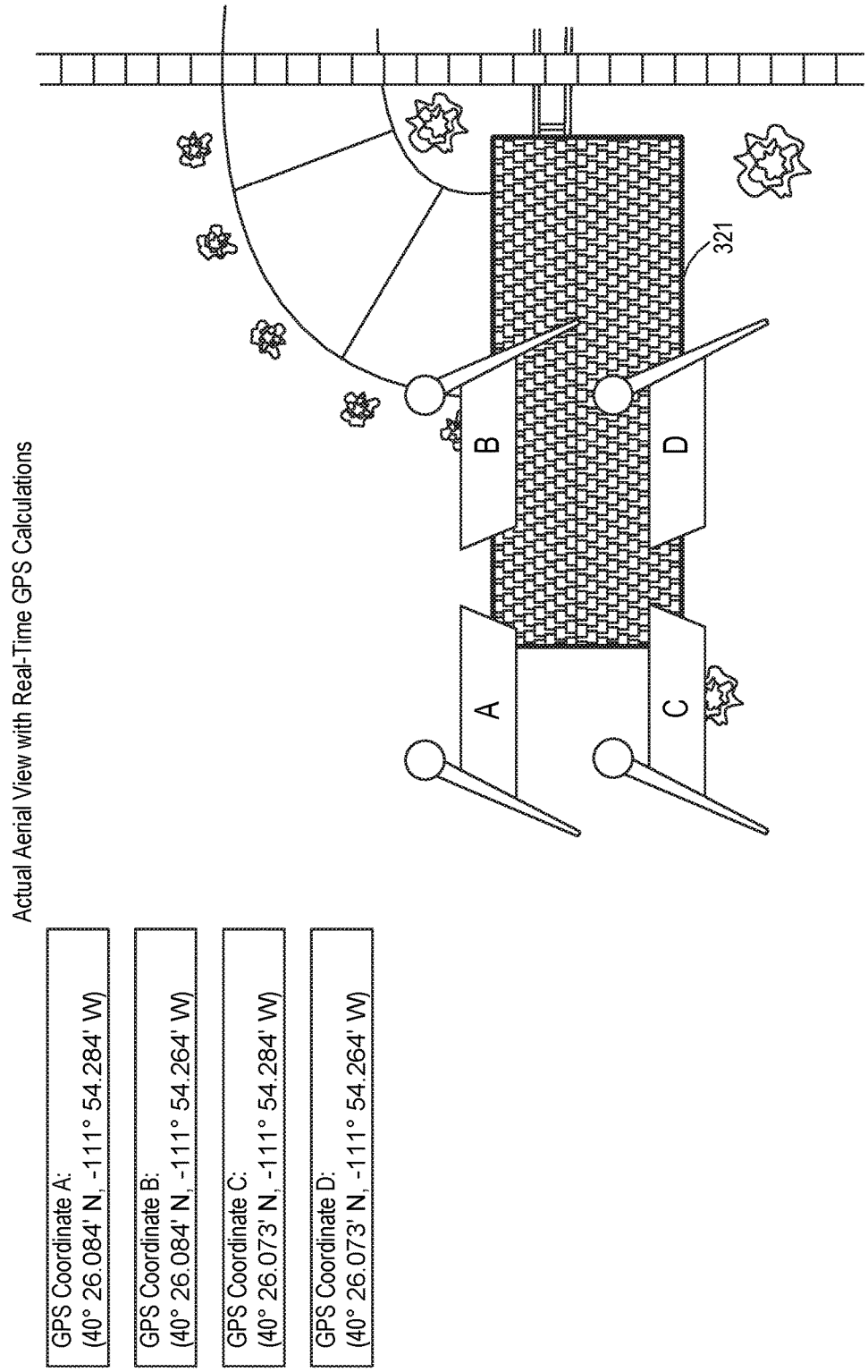
FIG. 3C illustrates a real-time aerial view with the GPS markers relative to the actual structure, according to one embodiment.

FIG. 3C illustrates a real-time aerial view with the GPS markers made by the user in FIG. 3B relative to the actual structure 321, according to one embodiment. As illustrated, the GPS markers A-D are erroneously offset relative to the structure 321 by a significant amount. A scan of the region bounded by the four corner markers A-D may not result in a complete scan of the roof as desired. The errors in the mapping system or GIS may need to be calculated for a corrected, enhanced, and/or more accurate scan.

Figure 3D:
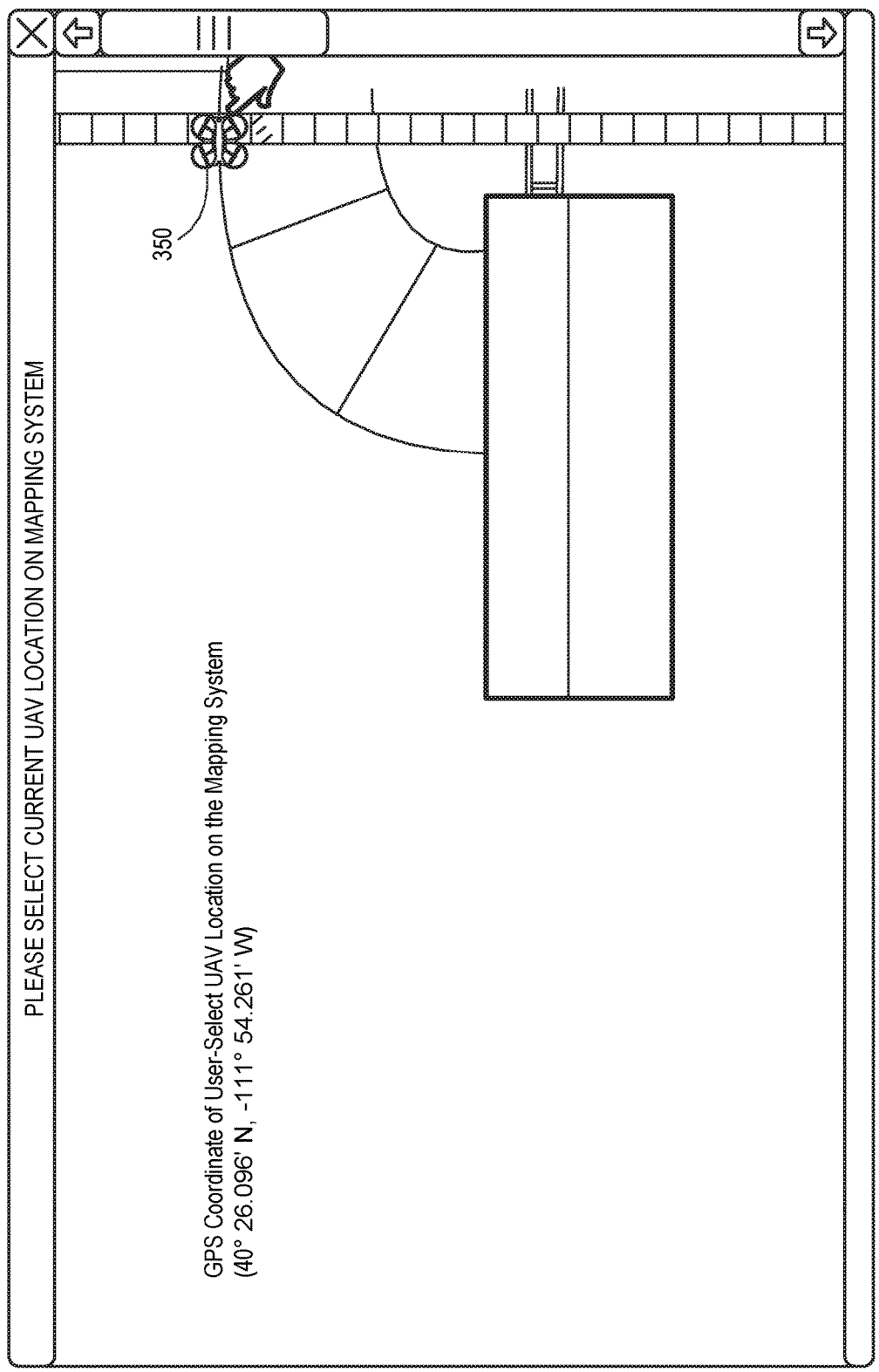
FIG. 3D illustrates a satellite view of the structure with a request that the user identify the current location of the UAV, according to one embodiment.

FIG. 3D illustrates the actual location of a UAV 350 as marked by a user in solid lines on a displayed image from the mapping system or other GIS, according to one embodiment. In the illustrated embodiment, a landmark location may be used that is easy for the user to identify. In the illustrated example, the user places the UAV 350 on the corner of the driveway and the sidewalk. This location is easy to identify on the mapping system and marked as the "current UAV location." Other identifiable locations may be a distinct walkway, a fire hydrant, an end of a driveway, the middle of a house, a patio, etc. The marked location may be a location of a UAV on the ground or suspended in the air.

The system may then compare the actual GPS coordinates being reported by the UAV 350 with the GPS coordinates provided by the mapping system based on the user-selected UAV location on the satellite image. The difference represents a coordinate offset that can be corrected or adjusted. Each set of coordinates may be associated with a margin for error. For example, the UAV 350 may indicate that the GPS coordinates are accurate ±2 meters. The mapping system may indicate that the accuracy is limited to ±1.5 meters. The offset may be calculated as the extremes (i.e., largest possible and smallest possible) offsets based on the reported accuracies. The offset value used for correction may be the largest possible offset, the middle or average offset, or the smallest possible offset based on the difference between the GPS coordinates and the reported accuracies.

Figure 3E:
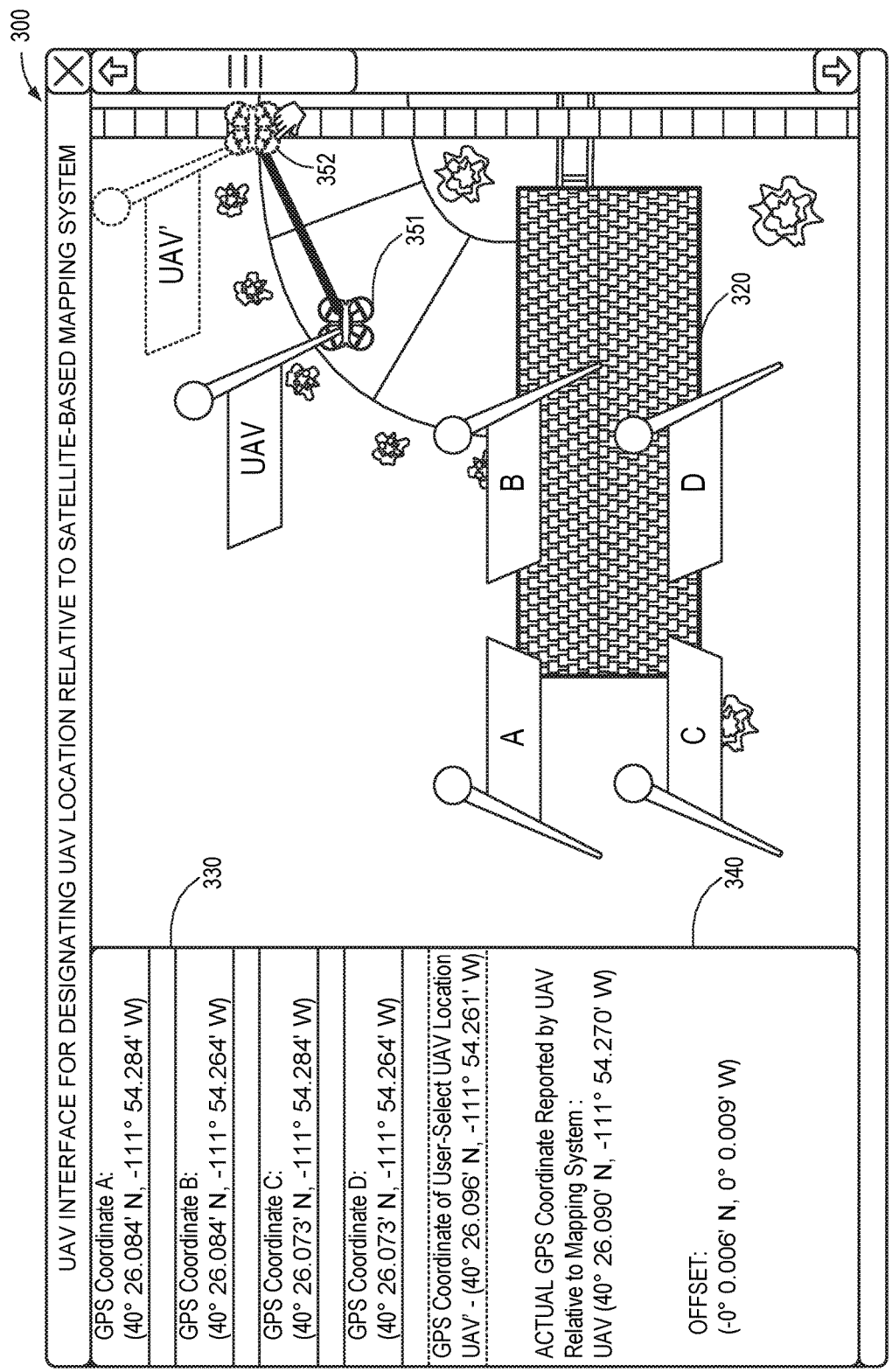
FIG. 3E illustrates the location of a UAV as marked by a user in dashed lines and the actual location of the UAV as reported by the UAV mapped onto a satellite image in solid lines, according to one embodiment.

FIG. 3E illustrates the location of a UAV 352 as marked by a user on the satellite image in dashed lines and the actual location of the UAV 351 in solid lines based on the UAV-reported coordinates mapped to the satellite image by the mapping system. The difference between the user-selected location 352 of the UAV on the mapping system and the UAV-reported GPS coordinates 351 can be used to calculate the coordinate offset value. In this instance, the GPS markers are shifted by −0.006' N and 0.009' West. The offset value may be used to shift the original user-marked corners A-D of the structure. The corrected values can be used to display the UAV in the correct location relative to the satellite images, ensure the correct portion of the structure is scanned, and/or associate captured sensor data (e.g., images, moisture, infrared images, etc.) with locations on the satellite images.

Figure 3F:
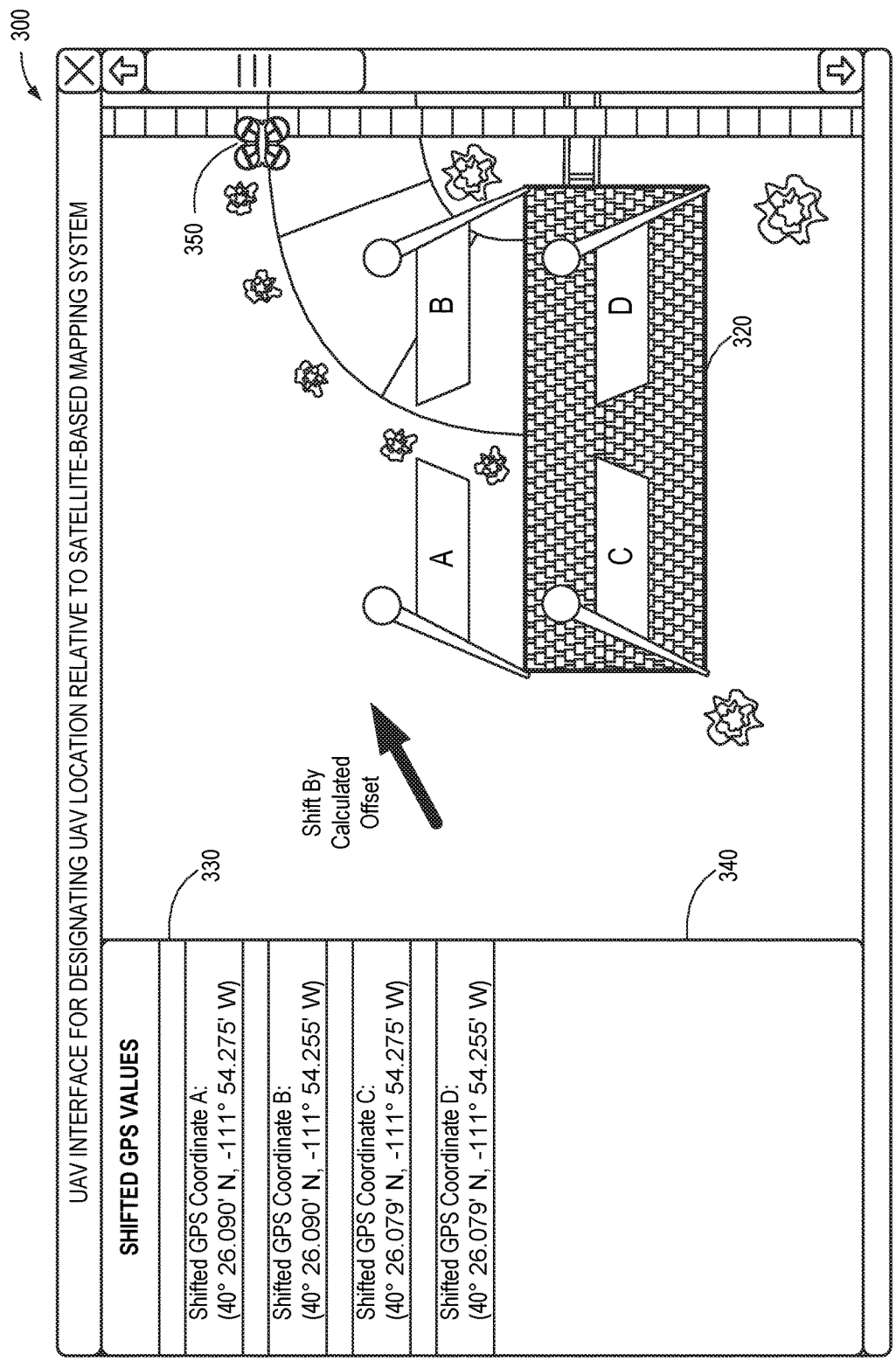
FIG. 3F illustrates offset GPS values for the markers to re-align them based on the calculated offset of the UAV from the mapping system location to the user-marked location, according to one embodiment.

FIG. 3F illustrates offset GPS values in the panel 330 for the markers that are re-aligned or shifted based on the calculated offset of the UAV 350 from the mapping system location to the user-marked location, according to one embodiment. In some alternative embodiments, a nadir image may be user-aligned with respect to the satellite image to determine an offset value. For example, rather than identifying a take-off location of a UAV, the UAV may fly up and capture a nadir image. The nadir image may encompass a large enough region to include the structure despite some expected offset.

The user interface may then show the nadir image as a transparent overlay (or vice versa) on the satellite image from the mapping system used to identify the region to be scanned (e.g., the four corners). The user may move (e.g., drag, point and click, use multi-touch gestures, etc.) the overlaid image to align it with the underlying image. Once aligned, the offset can be easily calculated based on a difference between the GPS coordinates of the UAV when in captured the nadir image and the shifted amount to align the images with respect to one another. Examples of such embodiments are described in greater detail below.

As provided above, the systems and methods described herein may utilize any type of mapping system of GIS system and make adjustments or enhancements to correct for shifted GPS data. By comparing known or marked locations on an image or map with actual reported data and/or captured images, a shift or offset value can be calculated and used to adjust subsequent or prior marks and images.

In some embodiments, offset values may be calculated and stored for subsequent use if a UAV is operated in the same or a nearby region. In some embodiments, an offset value may be (or may be assumed to be) consistent for a street, neighborhood, city, county, state, and/or for a particular mapping system and therefor applied as a default to future situations in that region and/or usage of the same mapping system. In some embodiments, default offsets may be applied based on averages or estimations based on offsets of nearby areas. For example, an offset for a first location may be 0.005 N and in a nearby second location 0.008 N. A location in the middle of the first and second locations may be default-shifted by 0.0065 N, absent user-calibration or location-specific offset calculation(s).

Figure 4A:
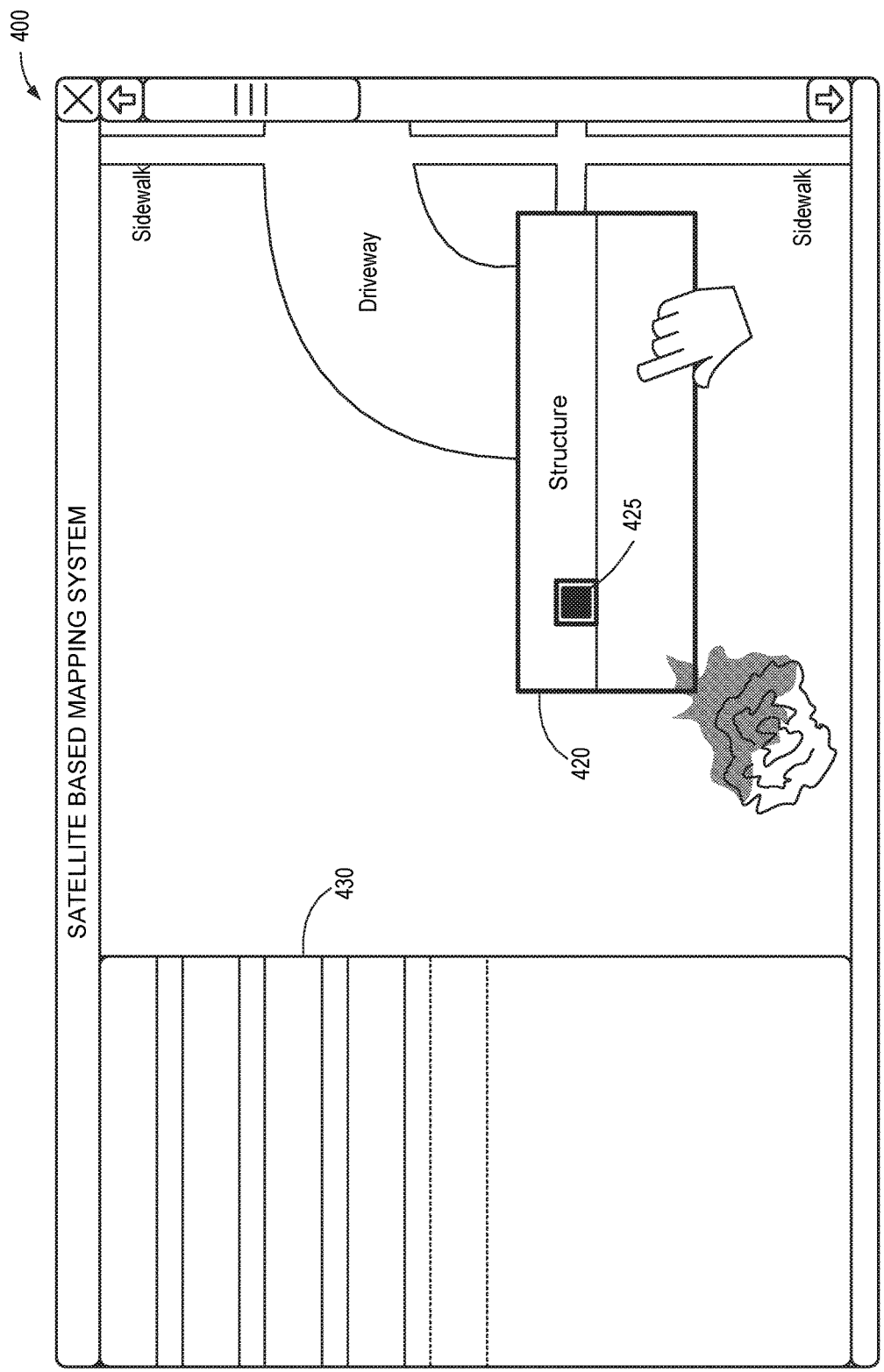
FIG. 4A illustrates a structure with a chimney being selected on a satellite based mapping system, according to one embodiment.

FIG. 4A illustrates a structure 420 with a chimney 425 being selected by an operator on a satellite based mapping system 400, according to one embodiment. A panel 430 may show GPS (or similar) coordinates for a selected area or point of interest. In some embodiments, panel 430 and actual GPS coordinates may be hidden and not shown to an operator to avoid confusion.

Figure 4B:
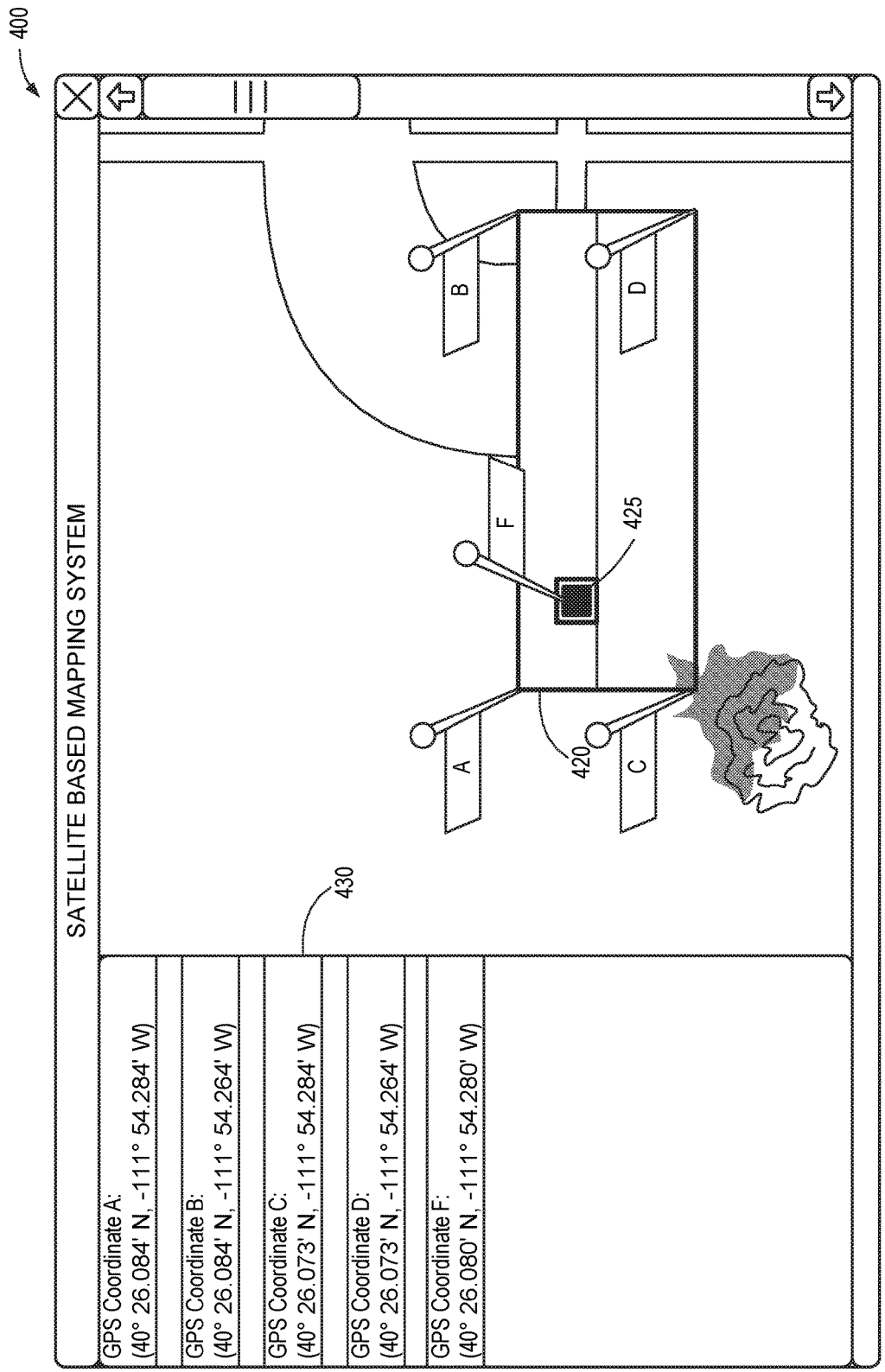
FIG. 4B illustrates GPS markers added to identified boundaries associated with the selected structure using the satellite based mapping system, according to one embodiment.

FIG. 4B illustrates GPS markers A-D and F added to identified boundaries associated with the selected structure 420 using the satellite based mapping system 400, according to one embodiment. GPS coordinates provided by the satellite based mapping system 400 are shown in panel 430. In some embodiments, one or more additional GPS markers may be added for notable features automatically detected by the system and/or manually by an operator.

Figure 4C:
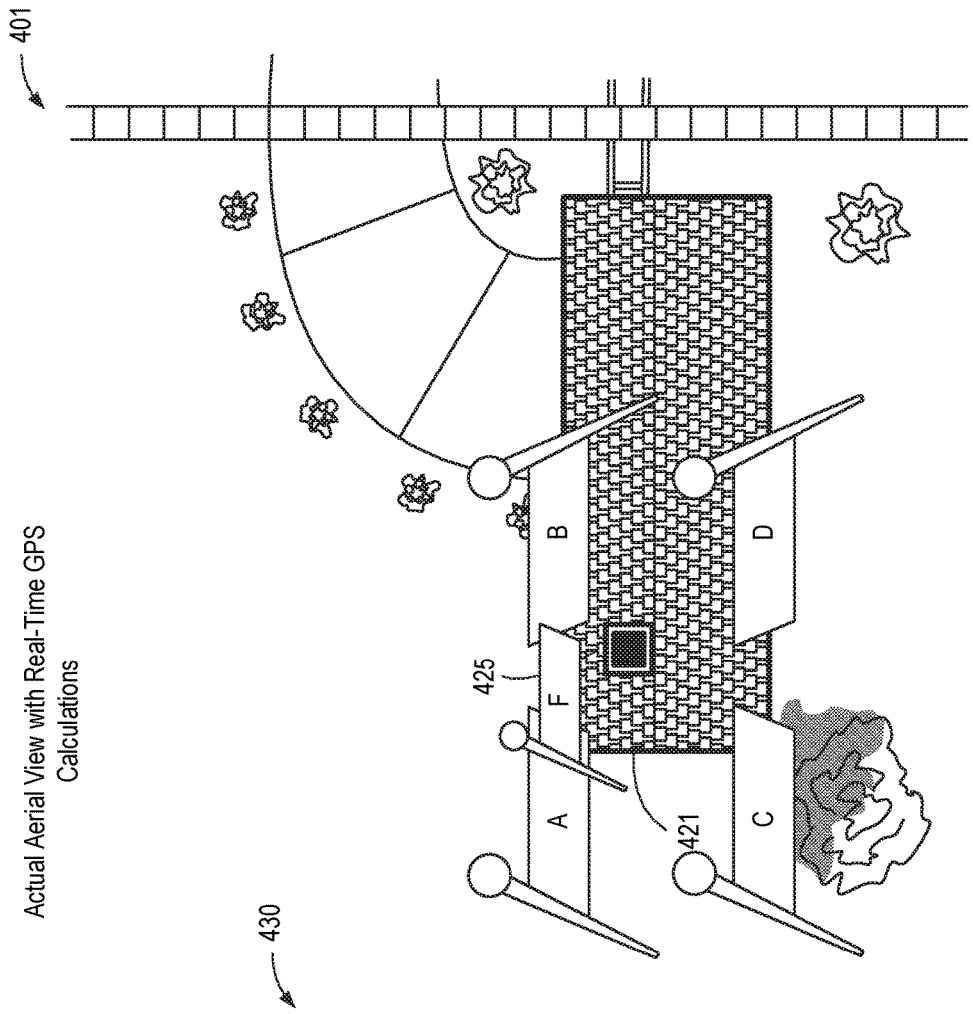
FIG. 4C illustrates a real-time aerial view with the GPS markers relative to the actual structure.

FIG. 4C illustrates a real-time aerial view 401 with the GPS markers A-D from the satellite based mapping system (FIG. 4B) relative to the actual structure 421 as seen from a UAV above the structure 421. As in the previous examples described in conjunction with FIGS. 3A-3F, it is readily apparent that the GPS markers A-D and F are offset relative to the actual structure.

Figure 4D:
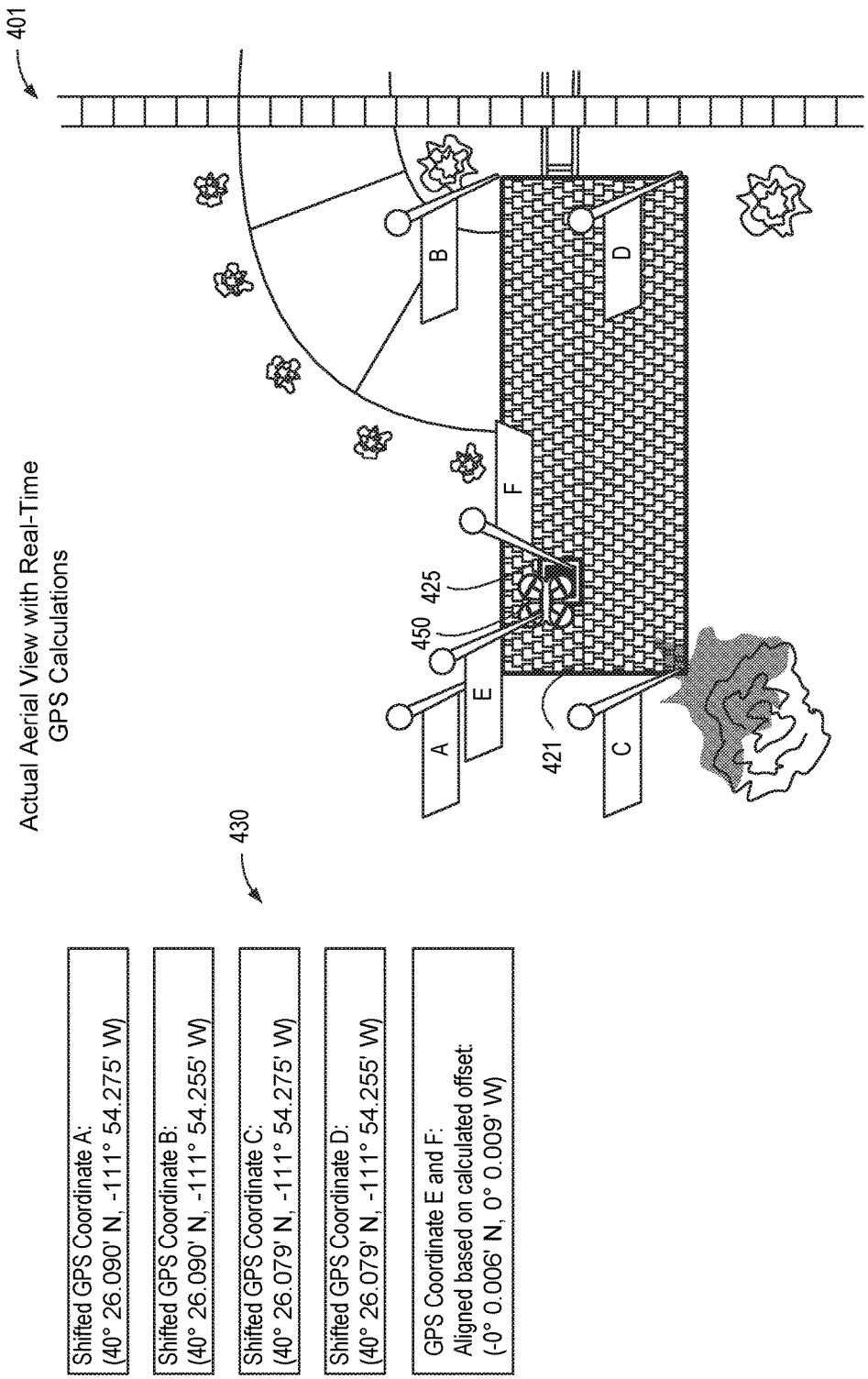
FIG. 4D illustrates a UAV positioned over an identifiable landmark (e.g., the chimney) to calculate a mapping coordinate offset.

FIG. 4D illustrates a UAV 450 positioned over an identifiable landmark (e.g., the chimney 425) to calculate a mapping coordinate offset. In the illustrated embodiment, the actual GPS coordinates (GPS marker E) of the UAV 450 when it is positioned directly over the chimney 425 can be used to align GPS marker F associated with the chimney 425 in the satellite based mapping system with the actual GPS coordinates from marker E based on a live or real-time UAV 450 measurement. The calculated offset between markers E and F can be used to adjust the GPS coordinates associated with GPS markers A-D.

Figure 5A:
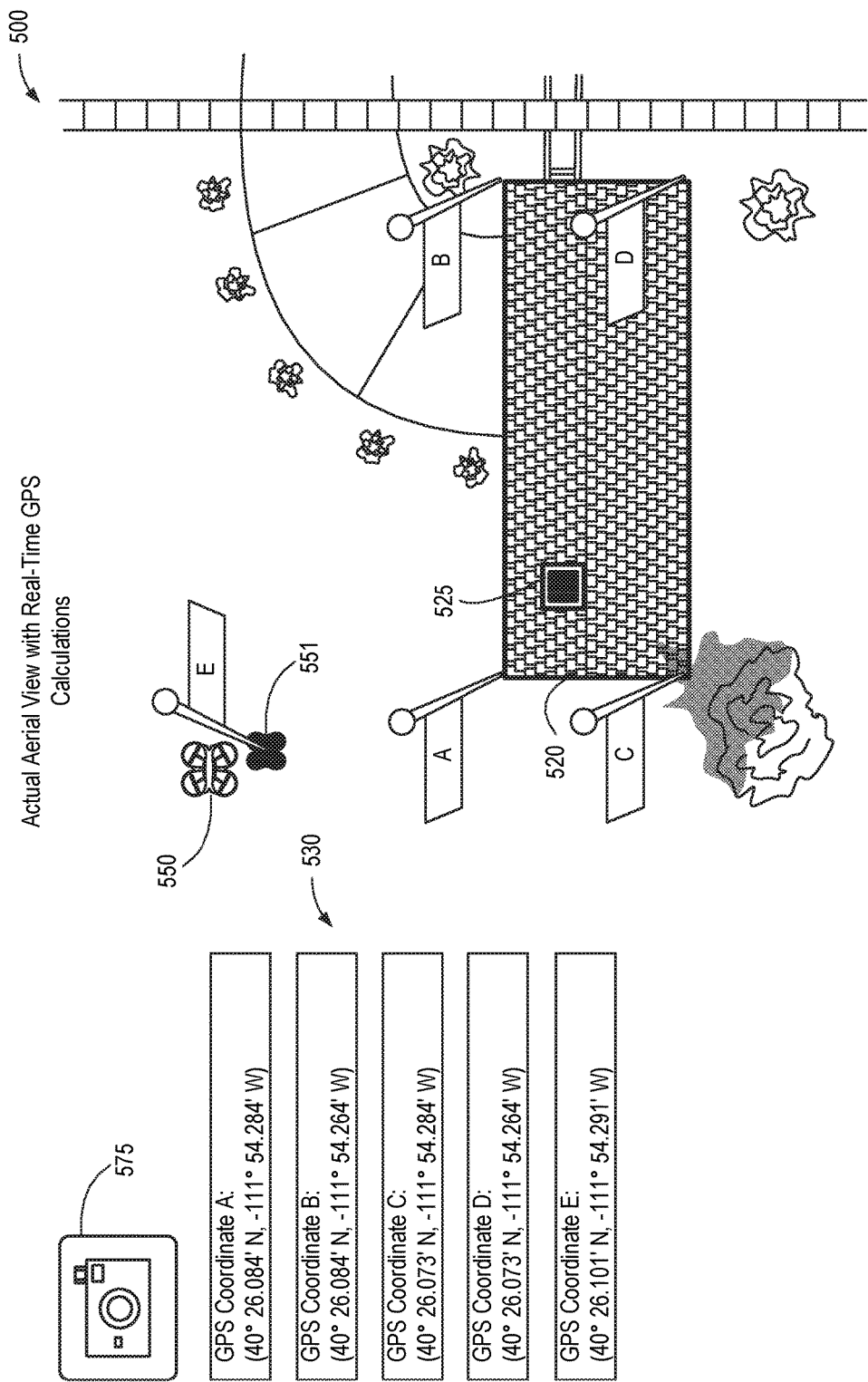
FIG. 5A illustrates a UAV capturing an aerial view of the structure and surrounding area in real-time.

FIG. 5A illustrates a UAV 550 capturing an aerial view of the structure and surrounding area 500 in real-time. A photo may be captured via icon 575 and/or live video may be utilized. The photo may be tagged with GPS data indicating a relative position in three dimensions which allows for appropriate angles to be calculated relative to satellite based imaging systems. In some embodiments, the UAV 550 may capture the image from a sufficiently high vantage point that the perspective nearly matches that of the satellite based imaging system for at least the area or point(s) of interest. GPS coordinates 530 may be associated with GPS markers A-D marking notable landmarks. In the illustrated embodiment, the corners of the structure 520 are used as the landmarks. In other embodiments, chimney 525, trees, sidewalks, driveways, fences, sheds, satellite dishes, and/or any of a wide variety of identifiable characteristics may be used.

Figure 5B:
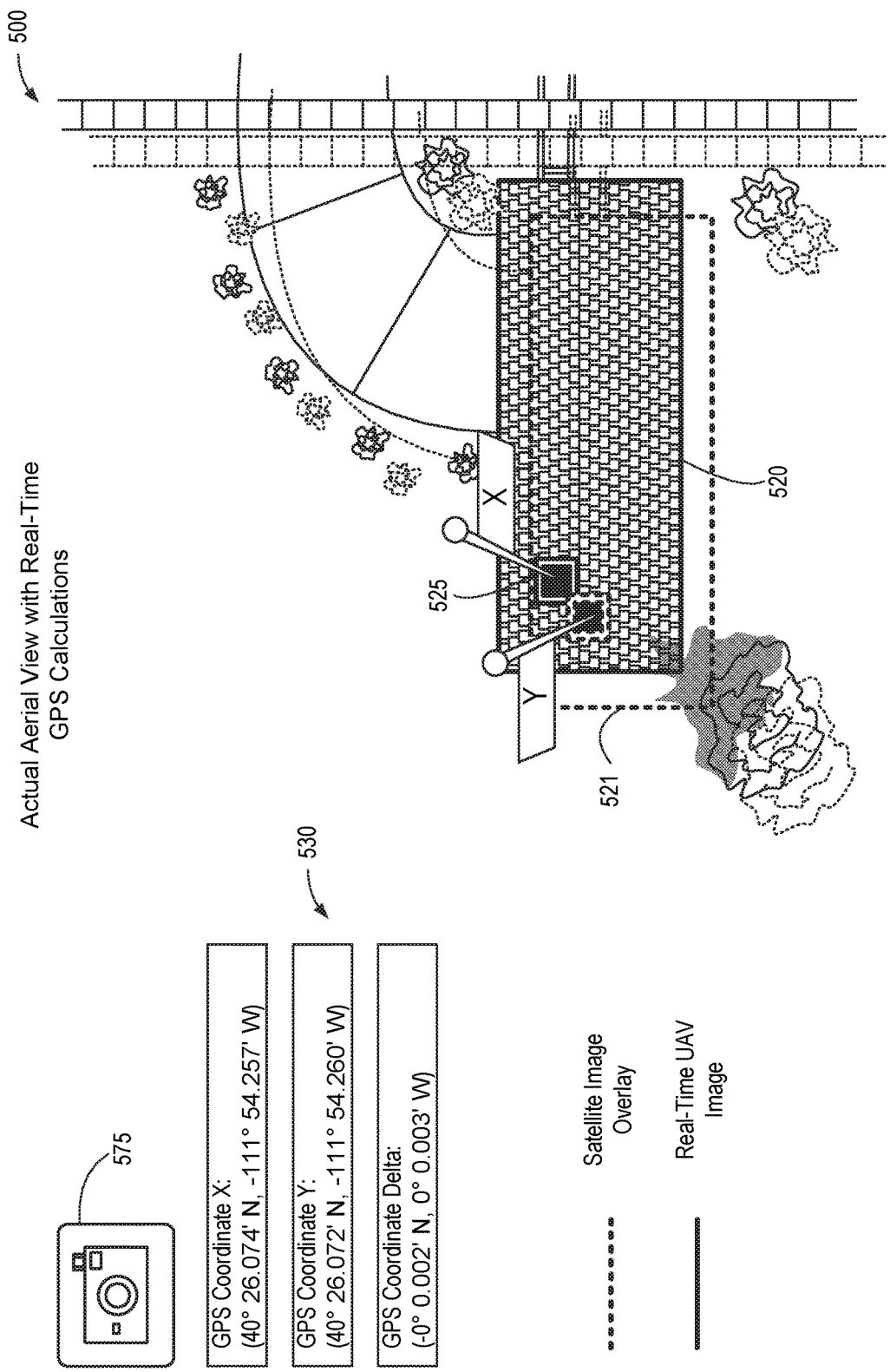
FIG. 5B illustrates the satellite image in dashed lines overlaid on the actual aerial view captured by the UAV, the difference in alignment corresponding to the mapping coordinate offset.

FIG. 5B illustrates a satellite image 521 in dashed lines overlaid on the actual aerial view 500 captured by the UAV, the difference in alignment corresponding to the mapping coordinate offset. Computer vision and other image detection techniques may be used to identify notable landmarks for location comparison between the satellite based imaging system and the actual aerial view captured by the UAV. The difference may be used as a coordinate offset or delta to shift other GPS coordinates. In the illustrated embodiments, the chimney 525 is used as the landmark for alignment using the GPS marker X from the UAV aerial view compared to the GPS marker Y for the chimney 525 from the satellite based image.

Figure 6A:
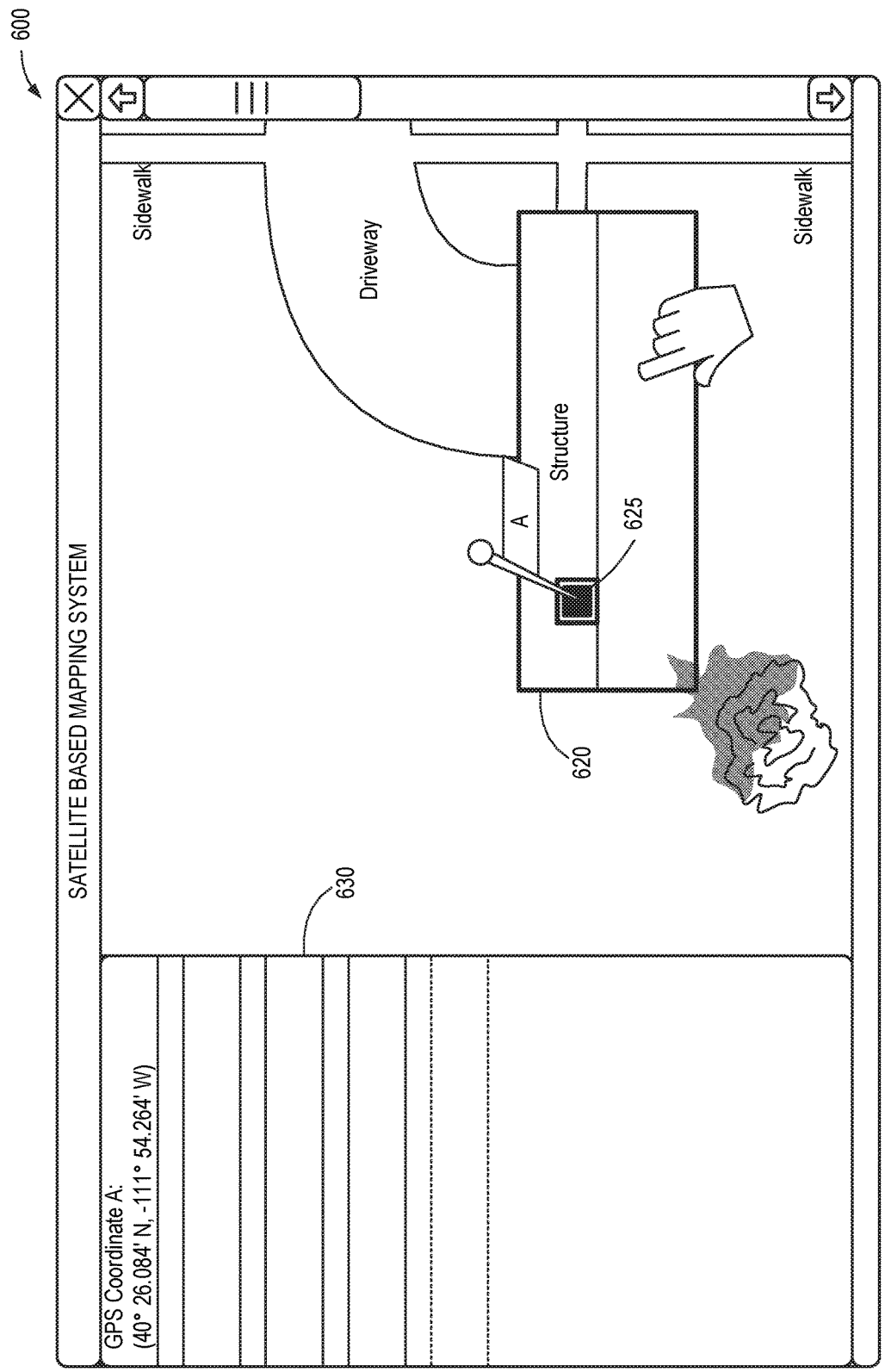
FIG. 6A illustrates a GPS marker identifying mapping coordinates of the chimney, according to one embodiment.

FIG. 6A illustrates a GPS marker A identifying mapping coordinates of the chimney 625, according to one embodiment. The GPS coordinate for the selected landmark (the chimney 625) is displayed in panel 630 of the user interface for the satellite based imaging system 600. The chimney 625 is selected as a notable landmark that is likely immovable relative to the structure 620. Alternative landmarks may be utilized, including corners of the structure 620, sidewalks, driveways, trees, sheds, towers, roof peaks, skylights, and/or other generally immovable objects.

Figure 6B:
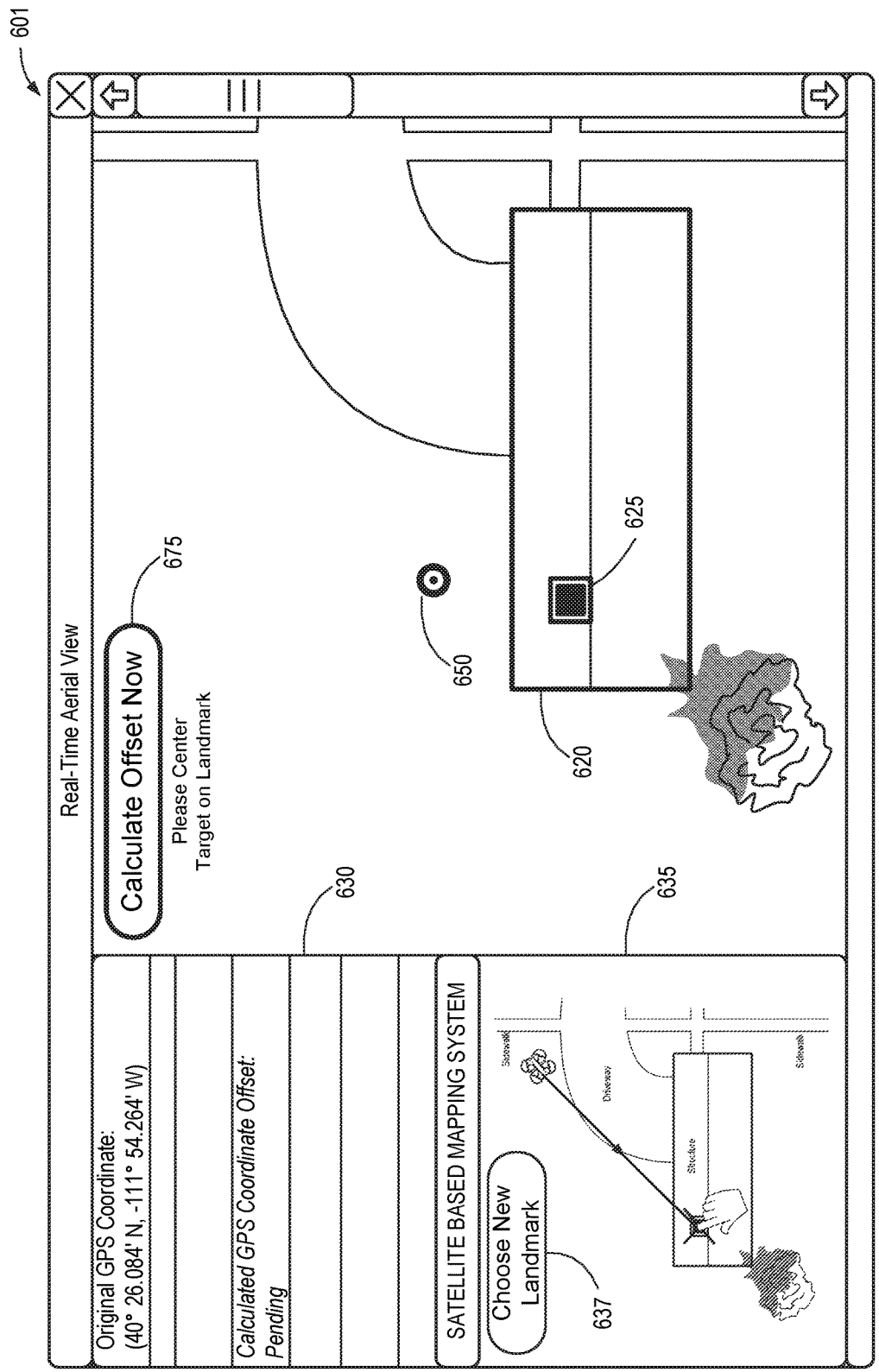
FIG. 6B illustrates a graphical user interface requesting that an operator of the UAV (or the UAV autonomously using computer vision techniques) navigate the done and position it over the selected landmark and initiate an offset calculation.

FIG. 6B illustrates a graphical user interface 601 requesting that an operator of the UAV (or the UAV autonomously using computer vision techniques) navigate the UAV and position it over the selected landmark chimney 625 and initiate an offset calculation. In the illustrated embodiment, original GPS coordinates for the chimney are shown in panel 630 along with a calculated GPS coordinate offset value—shown as "pending" since a calculation has not yet been performed. A panel 635 shows an image form the satellite based mapping system directing the UAV to position itself over the selected landmark (chimney 625). Panel 635 also allows the operator to select a new landmark via icon 637.

The main panel of the user interface includes an icon "calculate offset now" 675 to be selected manually or automatically once the UAV is positioned over the selected landmark (chimney 625). Instructions beneath the icon 675 direct the operator to center the target 650 over the landmark chimney 625 on the structure 620. Once the target 650 is positioned on the landmark chimney 625, the operator may select the calculate offset now icon 675 and a GPS coordinate offset will be calculated based on the original GPS coordinates of the chimney 625 using the satellite based imaging system and the actual GPS coordinates of the chimney 625 as measured by the UAV in real-time while it is positioned directly above the chimney 625 with the target 650 positioned thereon.

In some embodiments, the target 650 may not necessarily correspond to a location directly beneath the UAV. It is appreciated that the target 650 may be at a known angle relative to the position directly beneath the UAV, in which the case the calculated GPS coordinate offset value may be calculated using an algorithm that accounts for the angled offset of the target 650.

Figure 7A:
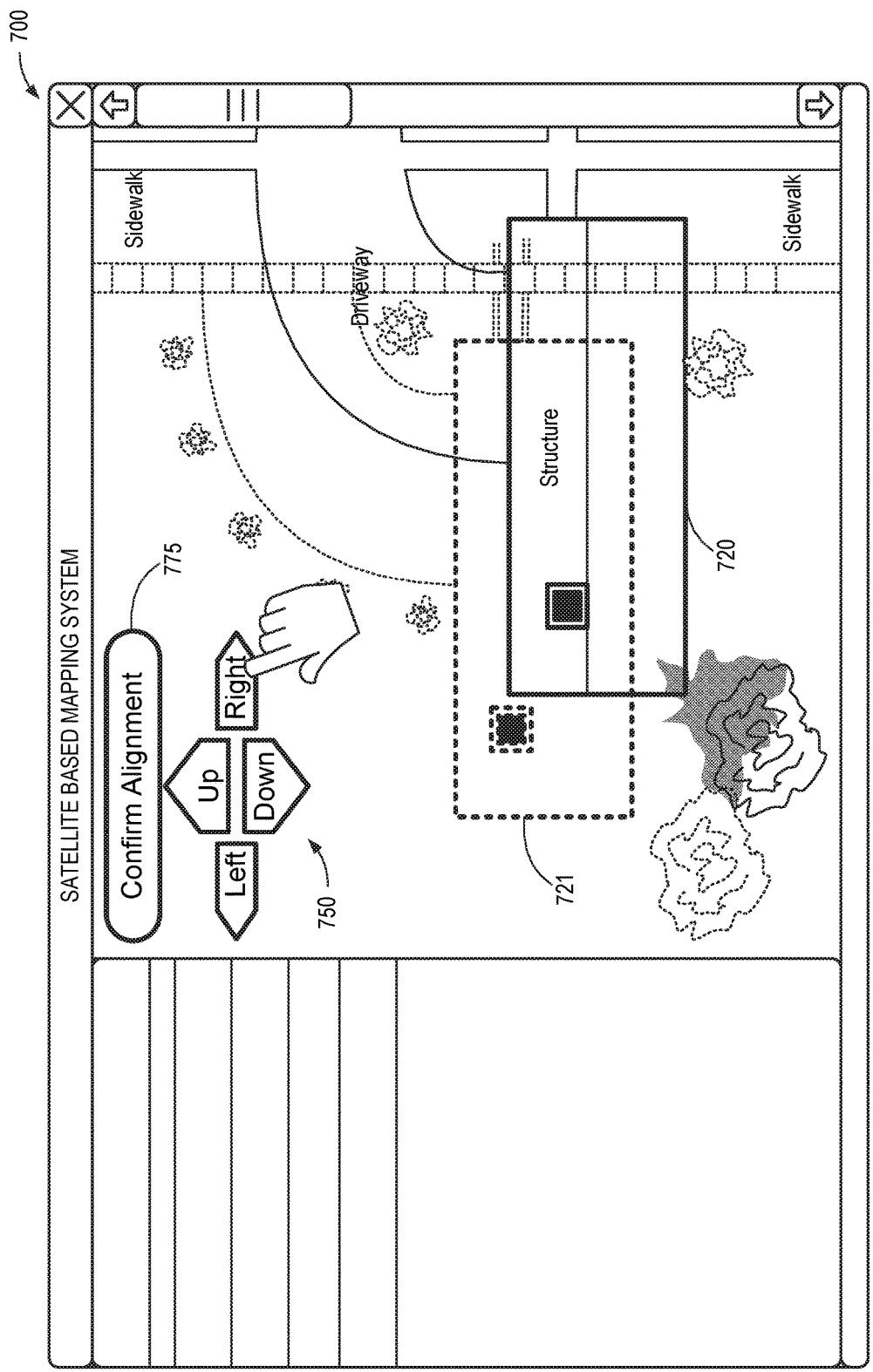
FIG. 7A illustrates an image from a satellite based image misaligned with respect to an aerial view of the same region based on a mapping coordinate offset, according to one embodiment.

FIG. 7A illustrates a user interface 700 that includes an image from a satellite based image 721 shown with dashed lines misaligned with respect to an aerial view of the same region 720 shown in solid lines. The misalignment corresponds to the mapping coordinate offset. The aerial view of the region 720 may be captured in real-time by the UAV. The overlaid satellite based image 721 may be moved on the user interface relative to the underlying aerial view using buttons 750. Once the dashed lines 721 are aligned with the solid lines, a "confirm alignment" icon 775 may be selected to calculate the coordinate offset.

Figure 7B:
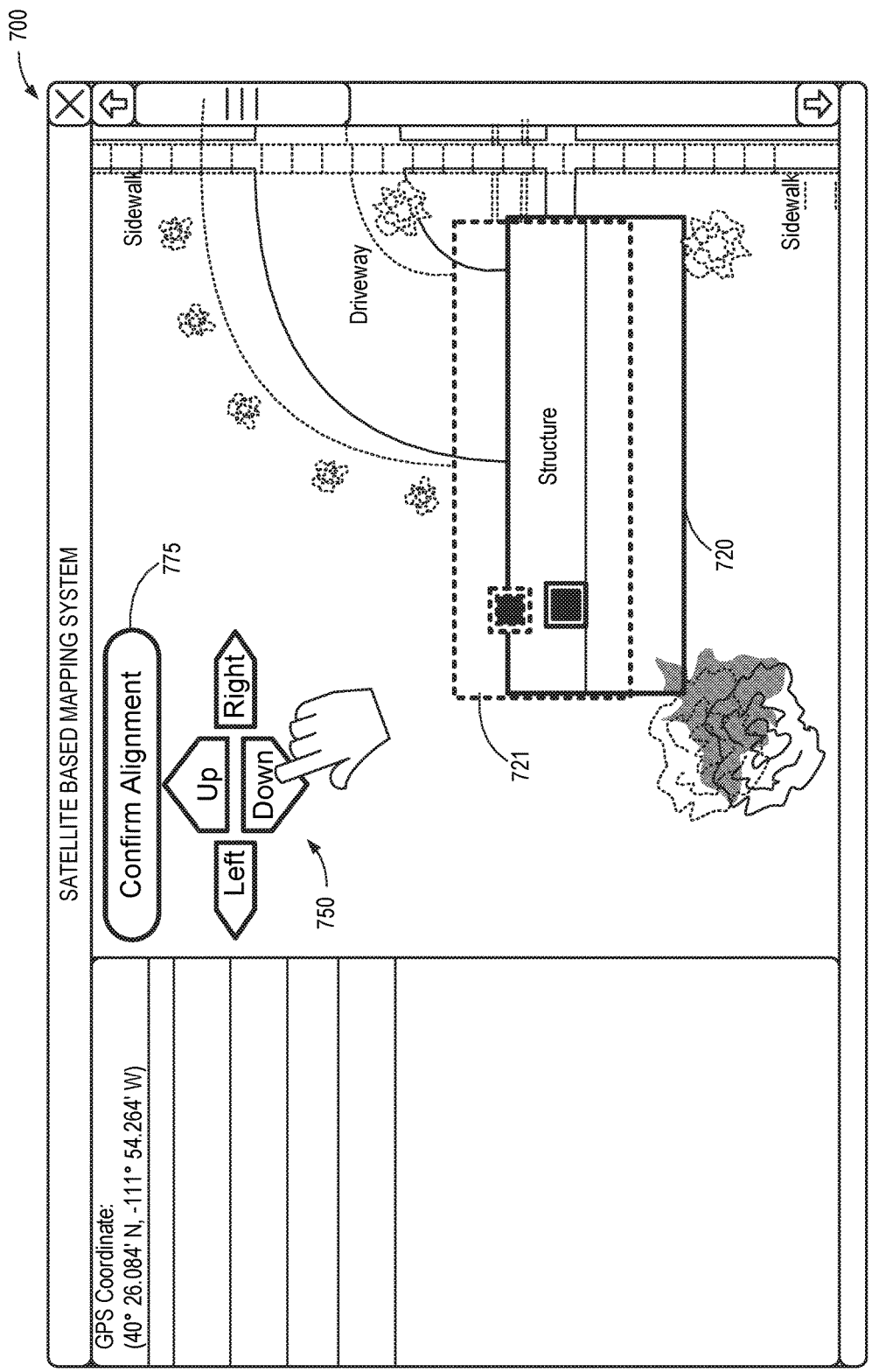
FIG. 7B illustrates the user moving the overlaid satellite based image with respect to the aerial view of the same region, according to one embodiment.

FIG. 7B illustrates the user moving the overlaid satellite based image 721 with respect to the aerial view 720 of the same region, according to one embodiment. As illustrated, the user has aligned the two images left to right and is now moving the dashed lines of the overlaid satellite based image 721 downward using buttons 750.

Figure 7C:
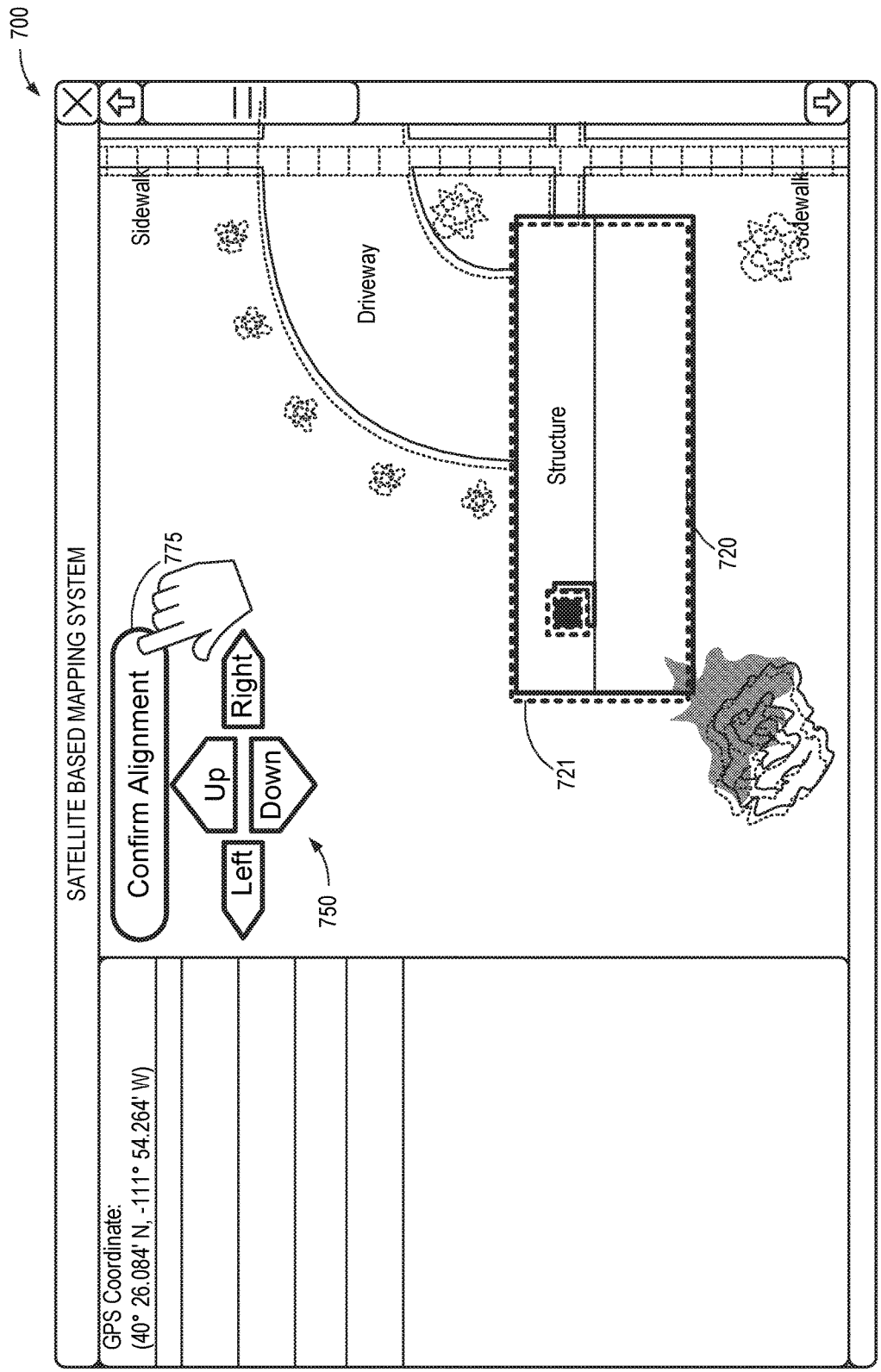
FIG. 7C illustrates the user confirming an alignment to calculate a mapping coordinate offset, according to one embodiment.

FIG. 7C illustrates the user confirming an alignment via icon 775 to calculate a mapping coordinate offset, according to one embodiment. The calculated offset represents the difference between the satellite based image 721 and the aerial view 720.

Using one or more of the embodiments described above, a selected area or point of interest may be ready to be scanned. Calculated offsets may be used to associate selections, markings, images, scan data, and/or other information between actual UAV-captured data and available GIS data.

While the embodiments described above allow for coordinate offsets to be calculated between a UAV and satellite based imaging systems, it is appreciated that similar coordinate alignment and offset calculation techniques may be used to align data captured by two different UAVs or between two different satellite based imaging systems. For example, a first UAV may be used in 2015 to capture scan data of a structure that is associated with GPS location data. A second UAV may be used in 2018 to capture scan data of the same structure. Due to geological shifting, improved GPS accuracy, different GPS readings, and/or other factors, the first scan data may not be perfectly aligned with the second scan data. Whether in real-time or after the fact (e.g., using stored images), the scan data may be aligned by calculated an offset value and applying it to the other scan data.

The illustrations in FIGS. 3A-7C discuss GPS offset calculations in the context of visible images, such as those captured by a visible light camera. However, it is appreciated that similar techniques may be used for ultraviolet image captures, infrared image captures, ultrasonic image captures, and/or other measurement data. In fact, in some embodiments, alignment of GPS data for visual images may be based on calculated offsets determined using other types of sensor data. As one example, infrared data may be more easily aligned in some embodiments because a hot surface may provide an easily distinguishable landmark relative to cool surfaces.

Alignment using any of the above-described embodiments may be used to enhance scanning and/or presentation of data as described herein. The alignment techniques described herein can be better understood in the context of the scanning and imaging techniques described below, but are not limited by the described scanning and images techniques nor must they be associated therewith.

Figure 8:
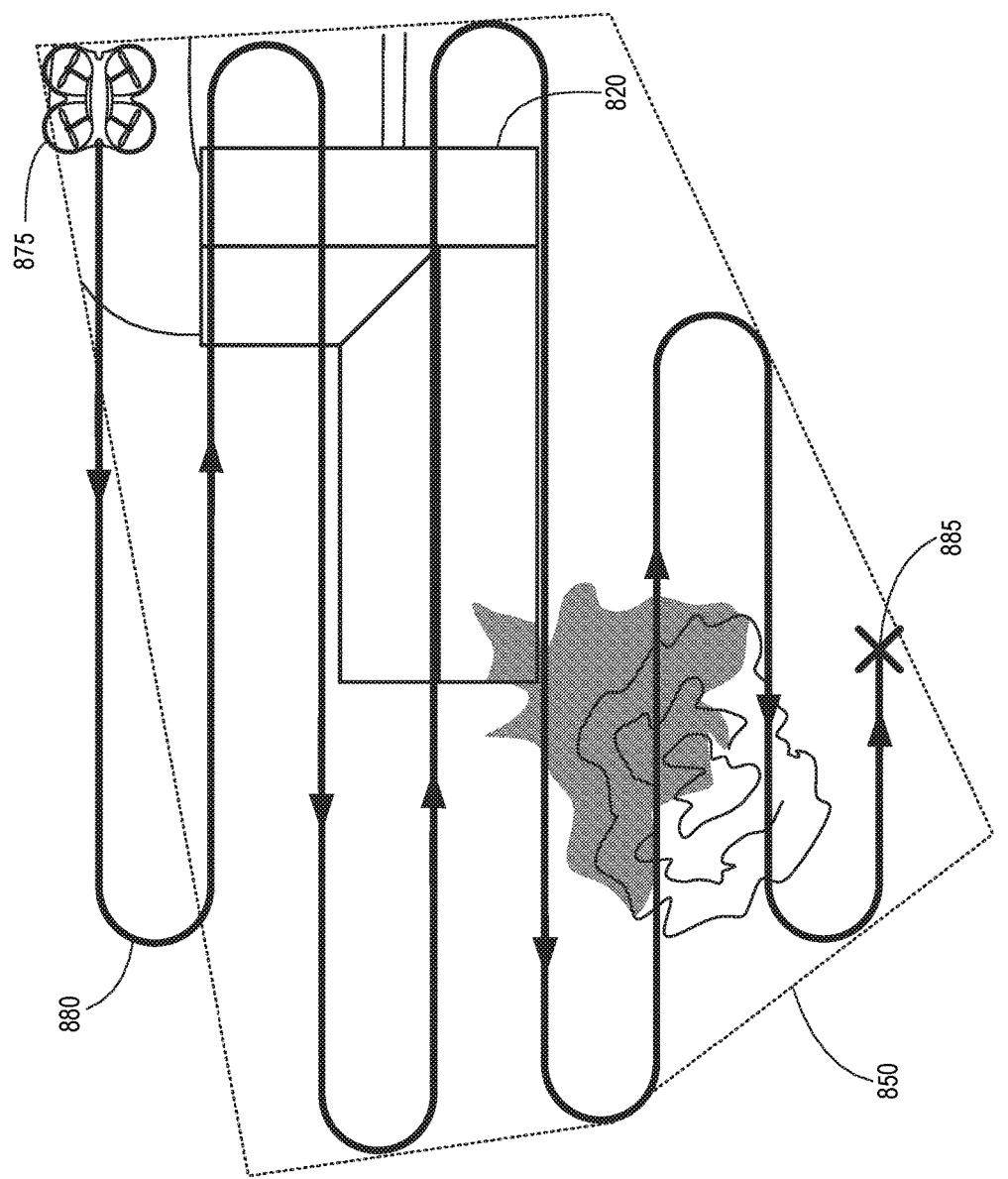
FIG. 8 illustrates a boustrophedonic scan of a site, according to one embodiment.

FIG. 8 illustrates a boustrophedonic scan of a site 850 defined by the identified geographic boundaries that include a structure 820. During the boustrophedonic scan, the UAV 875 may capture images while following a boustrophedonic flight pattern 880. For clarity, the number of passes shown is eight; however, the actual number of passes may vary based the size of the structure and/or property, on a desired resolution, camera field of view, camera resolution, height of the UAV 875 relative to the surface, and/or other characteristics of the desired scan, capabilities of the UAV 875, and attributes of the surface.

The UAV 875 may fly to a start location. The start location may be at a first corner of the site 850. The UAV 875 may then follow a straight path until a boundary line of the site 850 is reached. The UAV 875 may then turn and follow an offset path in the opposite direction. The UAV 875 may continue to travel back and forth until an end point 885 is reached and the entire site 850 has been traveled. The UAV 875 may travel at a high altitude such that it will not collide with any obstacle or structure and/or avoid obstacles in the path by going around or above them. During the flight, the UAV 875 may capture images. In some embodiments, onboard processing or cloud-based processing may be used to identify structures and obstacles. Alternatively, analysis may be conducted after scanning is complete and the UAV has returned home.

Figure 9:
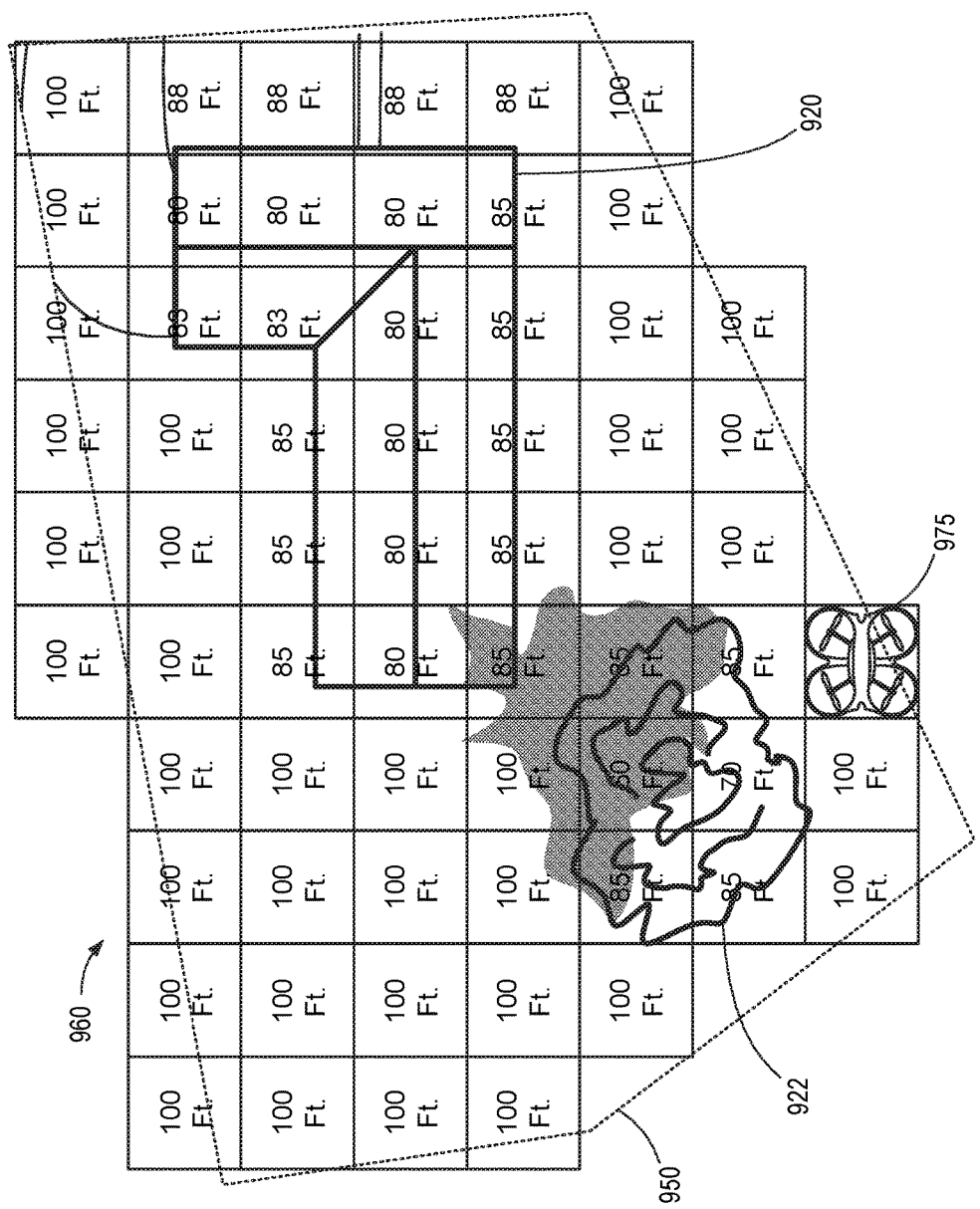
FIG. 9 illustrates an elevation map, according to one embodiment.

FIG. 9 illustrates an elevation map of a site 950 with a structure 920. As illustrated, a UAV 975 may map out the site 950 in a plurality of sub-locals 960. The UAV 975 may record the distances to a surface for each of the plurality of sub-locals 960 within the site 950. Each of the sub-locals 960 may correspond to potential vertical approaches for vertical descents during subsequent scans. The distances may be used to detect the location of a structure or any obstacles (e.g., tree 922) on the site 950. For example, the UAV 975 may determine the boundaries and relative location of a roof of the structure 920.

Figure 10A:
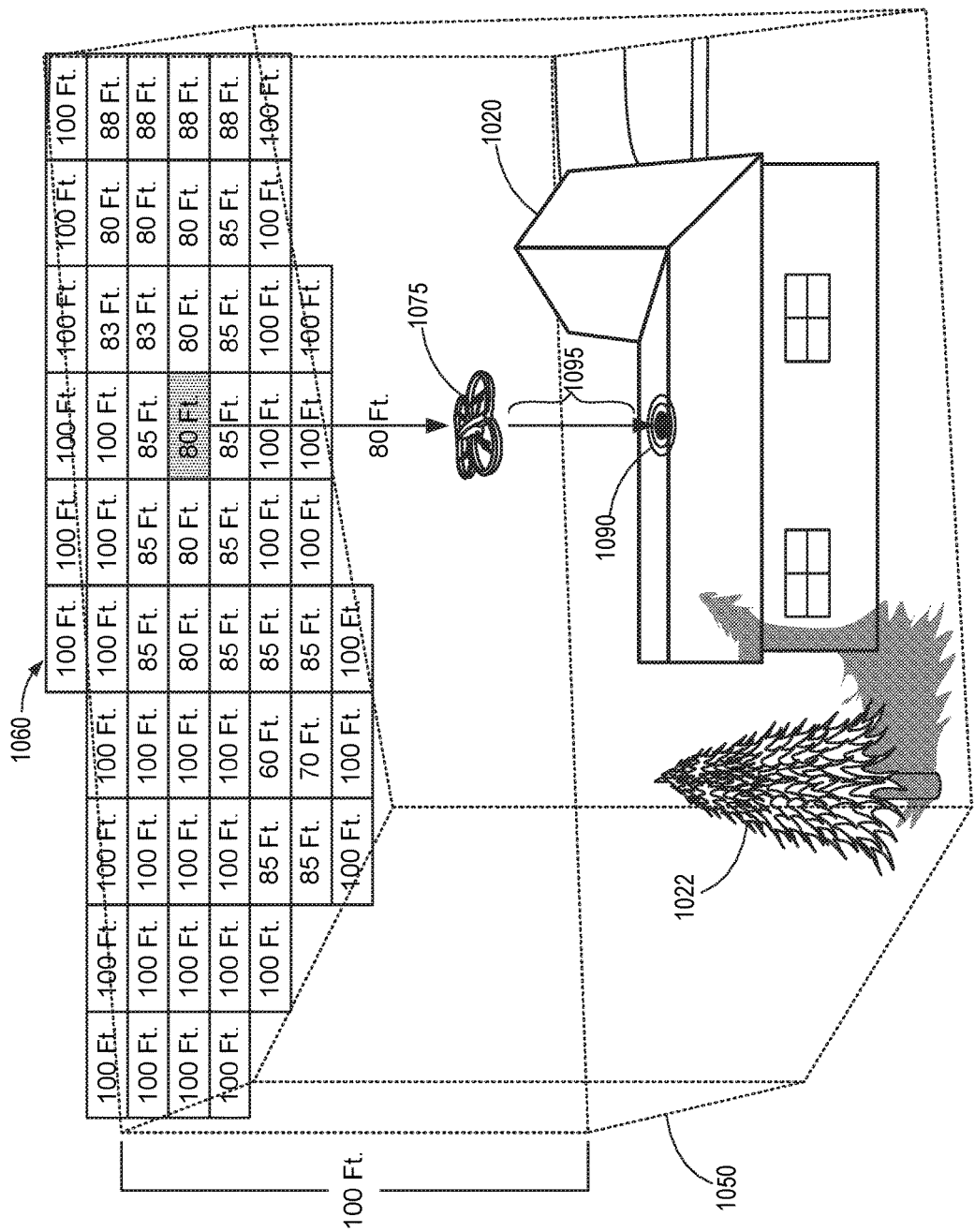
FIG. 10A illustrates an unmanned aerial vehicle (UAV) performing a micro scan of a site, according to one embodiment.

FIG. 10A illustrates a UAV 1075 performing a micro scan of a site 1050. As shown, the UAV 1075 may make a series of vertical approaches for each sub-local 1060. The UAV 1075 may descend within each vertical approach to a target distance 1095 and then capture a detailed image of a portion 1090 of a structure 1020. Some of the descents may culminate proximate a surface of the roof. Other descents may culminate proximate the ground and allow for imaging of a wall of the structure 1020 as the UAV 1075 descends proximate a wall of the structure 1020.

In some embodiments, the entire site 1050 may be micro scanned. In such an embodiment, the elevation map 960 from FIG. 9 may provide the height to obstacles 1022 and the structure 1020. The UAV 1075 may determine the altitude change necessary to reach the target distance 1095 for each sub-local 1060 based on the elevation map 960.

In one embodiment, certain portions of the site 1050 may be micro scanned while other portions are not. For example, the UAV 1075 may not micro scan the obstacle 1022. In another example, the UAV 1075 may only micro scan the structure 1020, or a certain portion 1090 of the structure 1020.

Figure 10B:
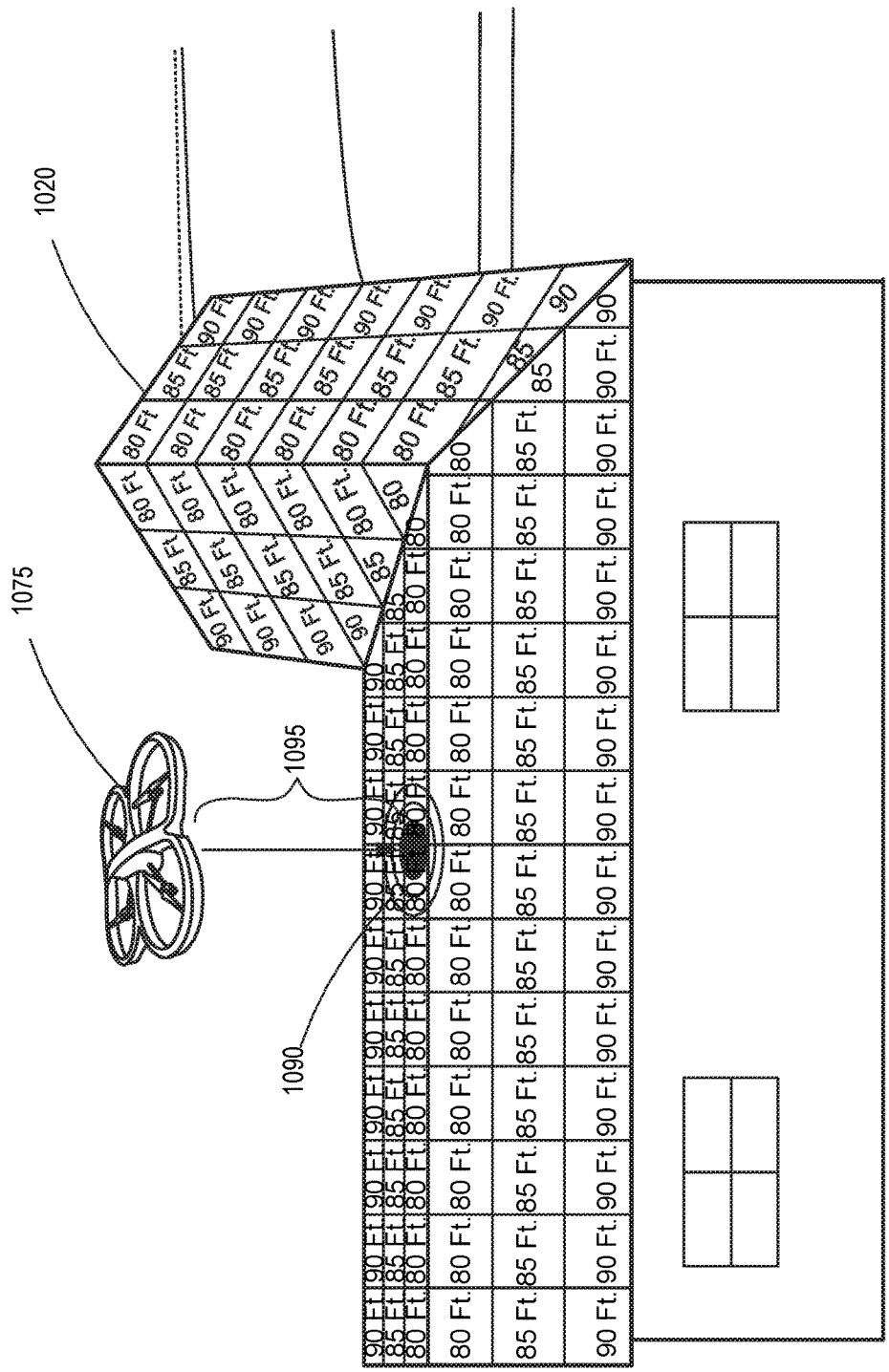
FIG. 10B illustrates an elevation map of a structure to allow for micro scans or detailed scans to be performed from a consistent distance to each portion of the structure, according to one embodiment.

FIG. 10B illustrates an elevation map of the structure 1020 to allow for micro scans or detailed scans to be performed from a consistent distance to each portion of the structure 1020. The UAV 1075 may descend within each vertical approach to within, for example, 15 feet of the structure 1020 for detailed images and/or other analysis to be performed.

In some embodiments, the UAV, or associated cloud-based control systems, may identify a pitch of the roof before performing micro scans. In such embodiments and possibly in other embodiments, each descent within each vertical approach may be used to scan (or otherwise analyze or collect data) of a portion of the structure 1020 that is not directly beneath the UAV 1075. Such an approach may allow for skew-free data collection. In other embodiments, micro scans may be performed directly beneath, to the side, behind, and/or in front of the UAV 1075 as it descends within each vertical approach.

Figure 11A:
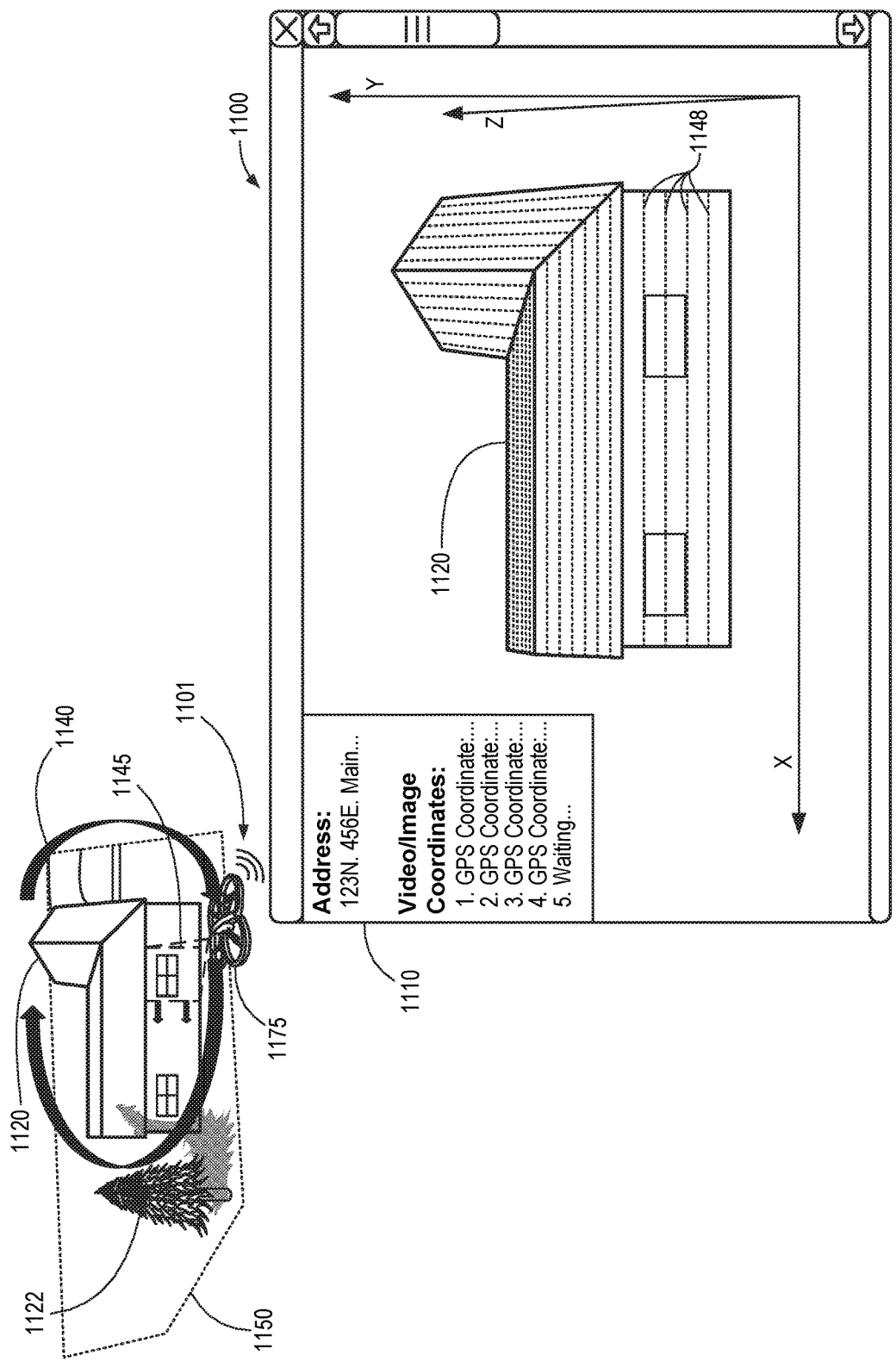
FIGS. 11A-C illustrate a loop scan and a model of a structure, according to one embodiment.
Figure 11B:
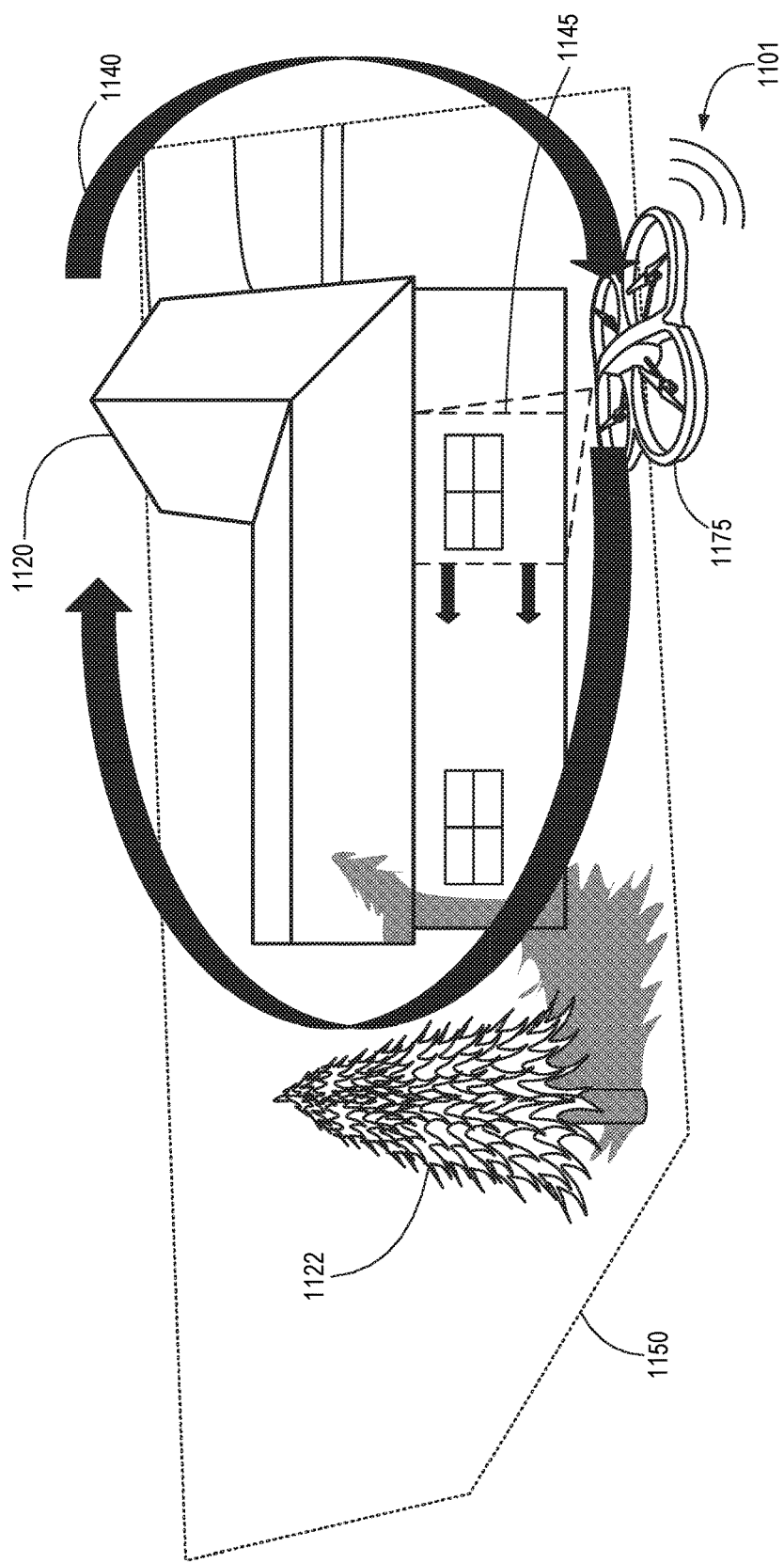
Figure 11C:
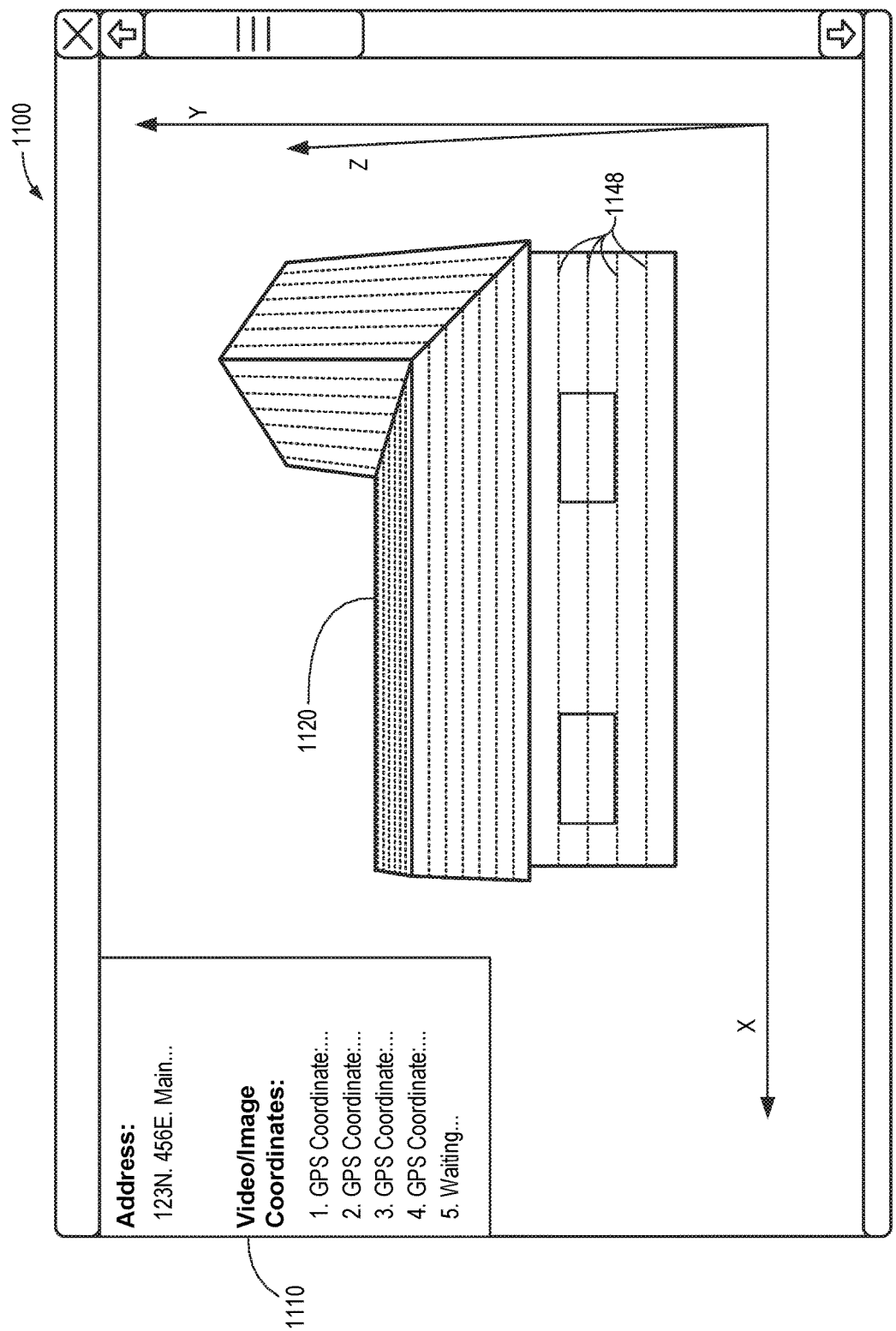

FIGS. 11A-11C illustrate a loop scan 1101 and a three-dimensional model 1100 of a structure 1120 on a site 1150. The loop scan 1101 may take a series of angled images 1145 of the walls 1148 of the structure 1120.

A UAV 1175 may perform the loop scan 1101 by following a second flight pattern 1140 that causes the UAV 1175 to travel around the perimeter of the structure 1120 at a second altitude range lower than the altitude of the boustrophedonic scan. By following a lower elevation, the UAV 1175 captures images of the side of the structure 1120. This may be used to create a higher resolution three-dimensional model 1100.

Figure 12:
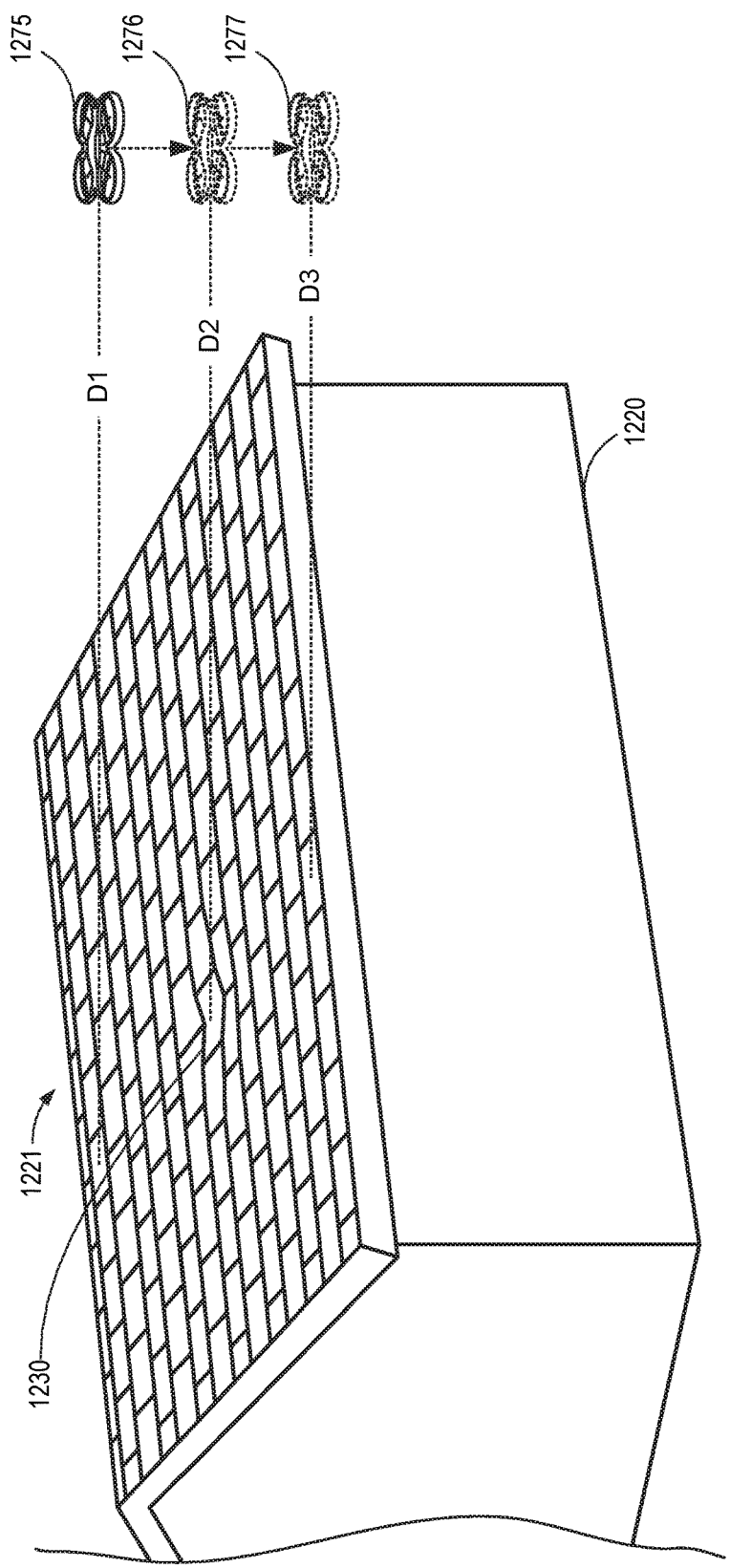
FIG. 12 illustrates a UAV determining a pitch of a roof, according to one embodiment.

FIG. 12 illustrates a UAV determining a pitch 1221 of a roof of a structure 1220. The UAV may capture three or more images of the roof: a first image at a first elevation 1275, a second image at a second elevation 1276, and a third image at a third elevation 1277. The first and the second elevations 1275, 1276 may be below the roof peak. The third elevation 1277 may be slightly above the rain gutters. The UAV may use these images along with associated meta data, including proximity data, to determine the pitch 1221 of the roof.

The UAV may also detect inconsistencies 1230 to the shingles on the roof. The inconsistencies 1230 may be a sign of damage to the roof. The UAV may mark the inconsistency 1230 as a portion of interest to micro scan.

In various embodiments, the UAV includes a propulsion system to move the UAV from a first aerial location to a second aerial location relative to a structure, as illustrated in FIG. 12. Movements may be horizontal, vertical, and/or a combination thereof. Lateral movements and rotation may also be possible. As previously described, the UAV may include one or more sensors that can be used, or possibly are specifically configured, to determine distances to objects, such as a roof. The UAV may determine a distance to a roof at a first aerial location. The UAV may then move to a second aerial location along a movement vector that includes one or more directional components (e.g., up, down, left, right, back, or forward, which could be more generally described as vertical, horizontal, or lateral, or even described using an X, Y, and Z coordinate system). A distance to the roof may be calculated at the second aerial location. A pitch of the roof may be calculated (e.g., geometrically) based on the distance measurements at the first and second locations and at least one of the components of the movement vector.

Figure 13:
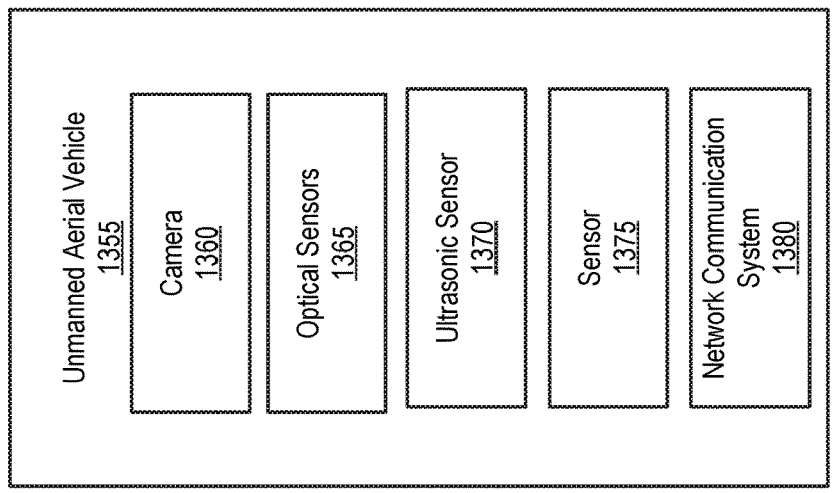
FIG. 13 illustrates a UAV assessment and reporting system for analyzing a structure, according to one embodiment.
Figure 13:
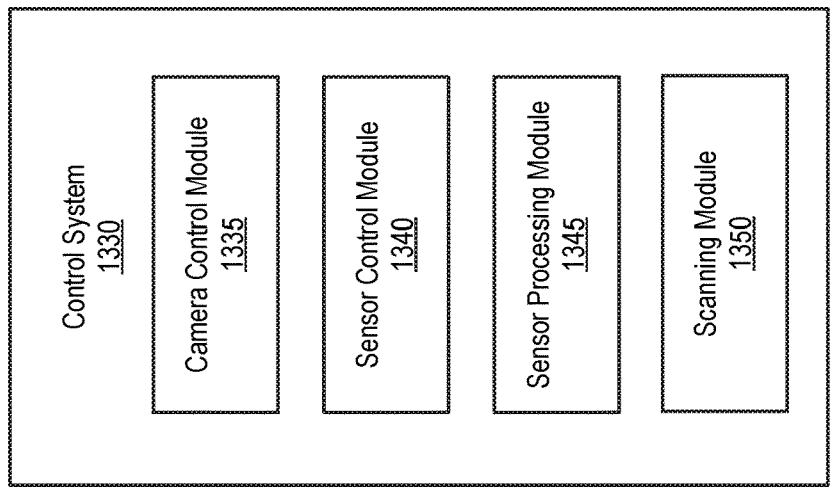
Figure 13:
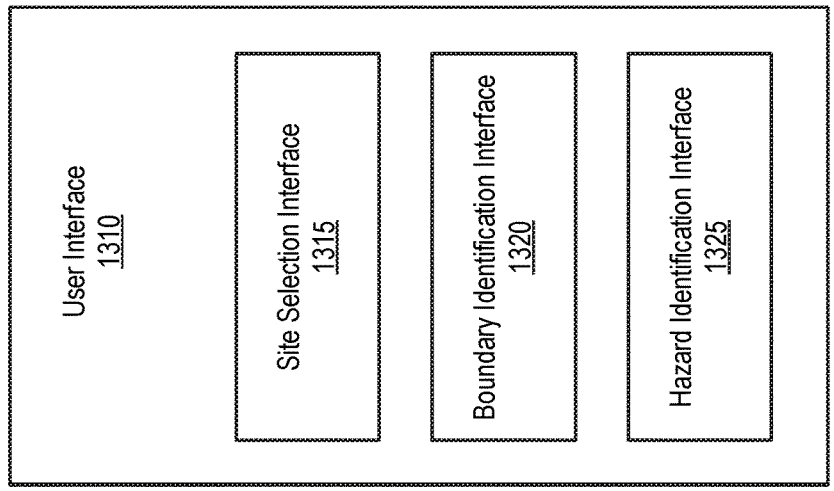

FIG. 13 illustrates an UAV assessment and reporting system for analyzing a structure, according to one embodiment. As illustrated, a user interface 1310 may include a site selection interface 1315 to receive an electronic input from an operator or other technician that identifies a location of a structure or other object to be assessed. The user interface 1310 may further include a boundary identification interface 1320 to receive user input identifying geographic boundaries of a site or lot containing a structure and/or of the structure itself. The user interface 1310 may additionally or optionally include a hazard identification interface 1325 allowing a user to identify one or more hazards proximate a structure or site identified using the site selection interface 1315.

A control system 1330 may be onboard a UAV 1355 or may be remote (e.g., cloud-based). The control system 1330 may provide instructions to the UAV 1355 to cause it to conduct an assessment. The control system 1330 may include a camera control module 1335, other sensor control modules 1340, image and/or sensor processing modules 1345, and/or scanning modules 1350 to implement boustrophedonic, loop, and/or micro scans. The UAV 1355 itself may include a camera 1360, one or more optical sensors 1365, ultrasonic sensors 1370, other sensors 1375, and one or more network communication systems 1380. FIG. 13 is merely representative of one example embodiment, and numerous variations and combinations are possible to implement the systems and methods described herein.

FIG. 14 illustrates a system 1400 for property, according to one embodiment. The UAV computer vision system 1400 may be onboard the aerial vehicle, cloud-based, or a combination thereof. The UAV computer vision system 1400 may include a processor 1430, memory 1440, and a network interface 1450 connected to a computer-readable storage medium 1470 via a bus 1420.

A scanning module 1480 may incorporate or control any of the systems described herein and implement any of the methods described herein. A navigation module 1482 may utilize navigation sensors of the UAV and include various control mechanisms for navigating the UAV to perform scans, including boustrophedonic, loop, and/or micro scans.

The risk zone generator 1484 may generate a risk zone associated with the property (e.g., vehicle, structure, tower, bridge, road, residence, commercial building, etc.) within which the UAV may navigate while performing one or more types of scanning operations. The risk zone generator 1484 may tag portions of the risk zone with scan-relevant tags and obstacle tags to aid the scanning of the property and/or avoid obstacles during navigation.

During micro scans, a tag reading module 1486 may receive information from tags based on the location of the UAV within the risk zone and relative to the property. The tag reading module 1486 may receive scan-relevant or navigation-relevant information. The information therein may be used to query a rule set 1488. The rule set 1488 may modify a navigation pattern, flight direction, scan type, scan details, or other action taken or being taken by the UAV in response to a rule set's interpretation of information provided by a tag read by the tag reading module 1486.

The UAV computer vision system 1400 may also access a library of data profiles 1489. Scan data captured by the UAV of any type of sensor may be compared and matched with data profiles within the library of data profiles 1489. In response to the UAV computer vision system 1400 identifying a match within the library of data profiles 1489, the rule set 1488 may dictate a modification to the scanning or navigation pattern.

This disclosure has been made with reference to various embodiments, including the best mode. However, those skilled in the art will recognize that changes and modifications may be made to the embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The scope of the present invention should, therefore, be determined to encompass at least the following claims:

What is claimed is:

1. An unmanned aerial vehicle (UAV) system for imaging a structure, comprising:
    a site selection interface to receive an electronic input corresponding to a location of at least a portion of a structure on a geographic information system (GIS), wherein the at least a portion of the structure is associated with GIS location coordinates;
    a navigation system to navigate a UAV proximate the structure using the GIS location coordinates;

a user interface to display a virtual target overlaid on a live-view video feed from the UAV;

a control interface to navigate the UAV to align the overlaid virtual target on the live-view video feed with a landmark geographically associated with the structure; and an offset calculation system to calculate a coordinate offset of the GIS location coordinates relative to real-time coordinates from the UAV, wherein the offset calculation system is configured to:

determine GIS location coordinates of the landmark geographically associated with the structure, determine real-time location coordinates of the landmark from the UAV, and calculate a coordinate offset based on a difference between the GIS location coordinates and the real-time location coordinates from the UAV with the overlaid virtual target on the live-view video feed aligned with the landmark.

2. The system of claim 1, wherein the GIS location coordinates for the landmark comprise global positioning system (GPS) coordinates, and wherein the real-time location coordinates of the landmark from the UAV comprise real-time GPS coordinates of the landmark via a GPS module in the UAV.

3. The system of claim 1, wherein the landmark comprises one of: a tree, a chimney, a sidewalk, a driveway, a corner of structure, and intersection of a driveway and a sidewalk, and a corner concrete.

4. The system of claim 1, wherein the GIS comprises a satellite-based mapping system, the GIS location coordinates comprise GPS coordinates, and the real-time coordinates from the UAV comprises real-time GPS coordinates, such that the coordinate offset corresponds to a delta between GPS coordinates of the landmark as identified by the satellite-based mapping system and GPS coordinates of the landmark obtained in real-time by the UAV.

5. A method of obtaining scan data of a point of interest using an unmanned aerial system (UAV), comprising:

receiving an electronic input identifying at least one point of interest to be scanned by a UAV on a geographic information system (GIS);

receiving location coordinates from the GIS for the at least one point of interest;

identifying a landmark proximate the point the interest;

receiving location coordinates from the GIS for the landmark;

navigating the UAV proximate the point of interest using the GIS location coordinates;

displaying a virtual target overlaid on a live-view video feed from the UAV in a graphical user interface;

navigating the UAV to align the overlaid virtual target on the live-view video feed with the landmark;

determining real-time location coordinates of the landmark via the UAV;

calculate a coordinate offset value based on a difference between the determined real-time location coordinates of the landmark with the received GIS location coordinates for the landmark;

calculate adjusted coordinates for the at least one point of interest by adjusting the GIS location coordinates for the at least one point of interest by the calculated coordinate offset value; and capturing scan data via the UAV of the at least one point of interest using the adjusted coordinates.

6. The method of claim 5, wherein the overlaid virtual target is aligned with the landmark by positioning the directly above the landmark.

7. The method of claim 5, wherein receiving the electronic input identifying at least one point of interest to be scanned by the UAV on the GIS comprises:

receiving the selection of a structure via a satellite-based mapping system.

8. The method of claim 5, wherein receiving location coordinates from the GIS for the at least one point of interest comprises receiving global positioning system (GPS) coordinates.

9. The method of claim 5, wherein the at least one point of interest comprises a structure, and wherein identifying a landmark proximate the point of interest comprises identifying a permanent fixture on a roof of the structure.

10. The method of claim 5, wherein receiving location coordinates from the GIS for the landmark comprises receiving global positioning system (GPS) coordinates of the landmark from the GIS, and wherein determining real-time location coordinates of the landmark via the UAV comprises receiving real-time GPS coordinates of the landmark via a GPS module in the UAV.

11. The method of claim 5, wherein the landmark comprises one of: a tree, a chimney, a sidewalk, a driveway, a corner of structure, and intersection of a driveway and a sidewalk, and a corner concrete.

12. A method of obtaining scan data of a point of interest using an unmanned aerial system (UAV), comprising:

receiving an electronic input identifying one or more points of interest to be scanned by a UAV on a geographic information system (GIS), wherein each of the one or more points of interest is associated with GPS coordinates from the GIS;

identifying, via a user interface, a take-off location on a satellite image of the GIS, wherein the take-off location is associated with GPS coordinates from the GIS;

receiving real-time GPS coordinates from a UAV at the take-off location;

calculating a coordinate offset between the GPS coordinates of the take-off location from the GIS and the real-time GPS coordinates from the UAV at the take-off location; and imaging the one or more points of interest via the UAV using the GPS coordinates from the GIS of the one or more points of interest adjusted by the calculated coordinate offset.

13. The method of claim 12, wherein receiving the real-time GPS coordinates from the UAV at the take-off location comprises receiving the real-time GPS coordinates as the UAV takes off from the ground.

14. The method of claim 12, wherein the one or more points of interest define at least a portion of a roof of a structure.

15. A method of obtaining scan data of a point of interest using an unmanned aerial system (UAV), comprising:

receiving an electronic input identifying a structure on a satellite-based mapping system to be scanned by a UAV, wherein the structure is associated with GPS coordinates from the satellite-based mapping system;

identifying the structure on a satellite image from the satellite-based mapping system;

navigating the UAV to a location proximate the structure using the GPS coordinates from the satellite-based mapping system;

receiving, via the UAV, a streaming video feed of nadir images that includes the structure;

associating real-time GPS coordinates from the UAV with the streaming nadir images;

displaying, in a graphical user interface, the satellite image and the streaming nadir images with at least one of them as a transparent overlay on the other, such that the satellite image and the streaming nadir images are both at least partially visible and offset with respect to one another by an amount corresponding to a difference between the GIS GPS coordinates and the real-time UAV GPS coordinates;

receiving operator instructions to move the UAV to align the streaming nadir images with the satellite image; and calculating a coordinate offset between the GIS GPS coordinates and the real-time UAV GPS coordinates based on the UAV movement to align the streaming nadir images with the satellite image.

16. The method of claim 15, wherein the satellite-based mapping system comprises a publicly available satellite-based mapping system.

\* \* \* \* \*